US007822660B1

(12) United States Patent
Donoho et al.

(10) Patent No.: US 7,822,660 B1
(45) Date of Patent: Oct. 26, 2010

(54) METHOD AND SYSTEM FOR THE PROTECTION OF BROKER AND INVESTOR RELATIONSHIPS, ACCOUNTS AND TRANSACTIONS

(75) Inventors: Steven Kirk Donoho, Chantilly, VA (US); Patrick Kiplinger Hyde, Falls Church, VA (US); Nimish Sheth, Falls Church, VA (US); Anil Sesha Kumar Venuturupalli, Fairfax, VA (US)

(73) Assignee: Mantas, Inc., Herndon, VA (US)

( * ) Notice: Subject to any disclaimer, the term of this patent is extended or adjusted under 35 U.S.C. 154(b) by 1511 days.

(21) Appl. No.: 10/686,462

(22) Filed: Oct. 15, 2003

Related U.S. Application Data

(60) Provisional application No. 60/453,112, filed on Mar. 7, 2003.

(51) Int. Cl.
    *G06Q 40/00* (2006.01)
(52) U.S. Cl. .......................... 705/35; 705/36 R; 705/37
(58) Field of Classification Search ................ 705/35, 705/36 R, 37
    See application file for complete search history.

(56) References Cited

U.S. PATENT DOCUMENTS

| | | | | |
|---|---|---|---|---|
| 4,114,027 | A * | 9/1978 | Slater et al. ................... | 705/43 |
| 6,006,206 | A * | 12/1999 | Smith et al. .................... | 705/35 |
| 7,155,510 | B1 * | 12/2006 | Kaplan ........................ | 709/224 |
| 2002/0138417 | A1 * | 9/2002 | Lawrence ..................... | 705/38 |
| 2002/0138461 | A1 * | 9/2002 | Sinclair et al. ................. | 707/1 |
| 2003/0033228 | A1 * | 2/2003 | Bosworth-Davies et al. .. | 705/35 |
| 2003/0083972 | A1 * | 5/2003 | Williams ..................... | 705/36 |
| 2003/0084053 | A1 | 5/2003 | Govrin et al. | |
| 2003/0204461 | A1 * | 10/2003 | Magary et al. ................ | 705/36 |
| 2003/0225663 | A1 * | 12/2003 | Horan et al. .................. | 705/36 |
| 2004/0107157 | A1 * | 6/2004 | Bleunven et al. ............. | 705/37 |
| 2004/0162742 | A1 * | 8/2004 | Stoker et al. ................... | 705/7 |

OTHER PUBLICATIONS

FD Wire, "Q4 2002 Safeguard Scientifics Inc. Earnings Conference Call—Final"; Feb. 27, 2003; Newswire, p. 6, Journal Code: BCDI.*
Badrinath, S.G; "Patterns of institutional investment, prudence, and the managerial "safety-net" hypothesis"; Dec. 1989, p. 13; ISSN: 0022-4367.*
Affidavit of Steven Kirk Donoho, Nov. 14, 2003.
U.S. Appl. No. 10/341,073, filed Jan. 13, 2003, Zhang et al.
U.S. Appl. No. 10/379,425, filed Mar. 4, 2003, Donoho et al.
U.S. Appl. No. 10/665,712, filed Sep. 19, 2003, Donoho et al.
U.S. Appl. No. 60/453,124, Donoho et al.

* cited by examiner

*Primary Examiner*—Lalita M Hamilton
*Assistant Examiner*—Edward Chang
(74) *Attorney, Agent, or Firm*—Townsend and Townsend and Crew LLP

(57) ABSTRACT

A computer based method and system for advanced scenario based alert generation and processing is presented, with the specific ability to broker and investor activities that put either at risk. Advanced scenarios that describe such broker and investor activities are specifically defined. By applying these scenarios to transactional data from a variety of financial institutions, broker and investor activities causing unacceptable amounts of risk can be detected on an automated basis.

2 Claims, 38 Drawing Sheets

700 ～ EXAMPLE #1: FIND AAA IN THE FOLLOWING STREAM OF EVENTS: ～712
ABCBACBCAAABCBACBBCCBAAAABBC ～716
          721      724
                   728

704 ～ EXAMPLE #2: AB*A MEANS "FIND AN A FOLLOWED BY ZERO OR MORE B'S FOLLOWED
BY AN A": ～732
CADAACDBADADABABBBBBACDABDABDCABDB ～736
 740        744
            748

708 ～ EXAMPLE #3: A(BC)+ MEANS "FIND AN A FOLLOWED BY ONE OR MORE BC PAIRS": ～752
DCBCABCDCABCBCBCBCBBD ～756
 760  764   768
      772
      776

FIG. 7

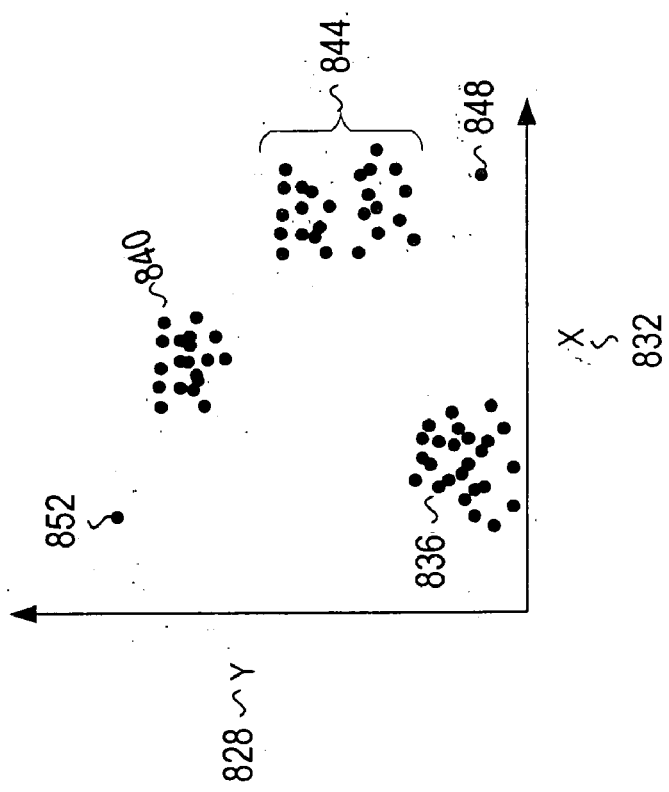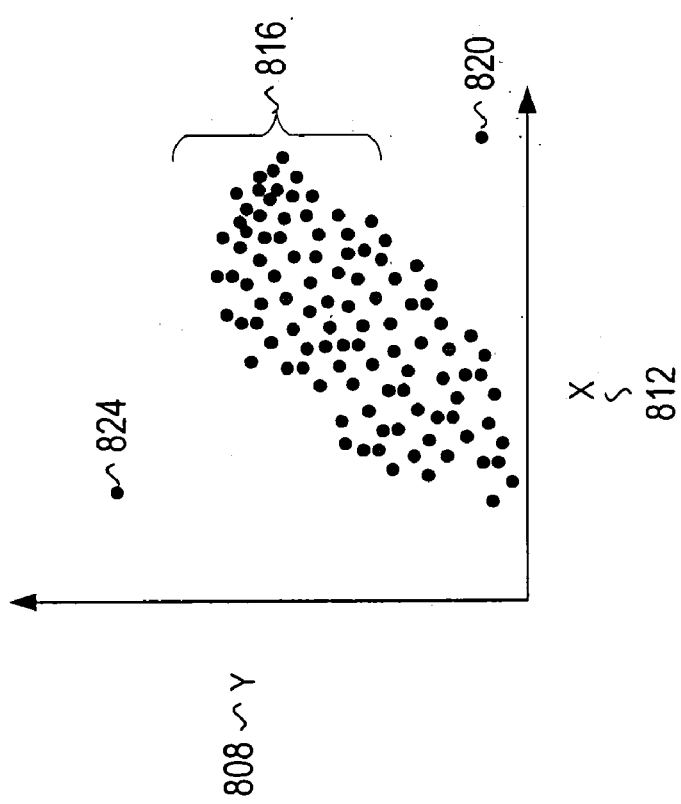
FIG. 8

Transactions

| Date | Type | Amount | Number | Remitter | Remitter Address |
|---|---|---|---|---|---|
| 07/31/00 | Monetary Instruments | $100,000 | 100 | Helen | |

1800

Alert History                                                          2 of 2 Displayed       HELP>>

| Date | Action | By | Alert ID | Scenario | Highlights |
|---|---|---|---|---|---|
| 03/31/00 | Closed - case opened | L. Martinez | 3018 | Hidden Relationship | Recurring Remitter, MI 101, $101,000 |
| 01/31/00 | Closed | M. Murphy | 2667 | Hidden Relationship | Recurring Remitter, MI 200, $200,000 |

1804

Previous SARS Filed                                                                                          HELP>>

| Date Filed | SAR Database Reference Number | Compliance Manager | Law Enforcement Notified | Agency Notified |
|---|---|---|---|---|
| 04/24/00 | SAR 4356 | M. Humphry | No | |

1808

*FIG. 18* mantas

AML | Reports | ▶ Workload Management

Kiosk | Alerts | Inquiry | Reports | Preferences | Logout

Overview | Workload Management | Alert Disposition

Select an Organization or User and a Scenario Class or specific Scenario for the report.

Filter by:
Organization: [   ]    or Owner: [All]
Scenario Class: [All]  or Scenario: [All]
Age >= [0]

(Help) (Edits)

Workload Management Report
Report Date: 04/20/01
Report Time: 14:32
Subject: All (Print Preview) (Help)

| Total | <=5d | <=10d | <=20d | >20d |
|---|---|---|---|---|
| 474 | 456 | 17 | 9 | 0 |

Scenario Class: All — Alerts 0 Days and Older

| Organization / Owner | New Alerts | | Open Alerts | | Reopened Alerts | |
|---|---|---|---|---|---|---|
| | Alerts | Avg Time | Alerts | Avg Time | Alerts | Avg Time |
| IA Pool | 100 | 1d, 2h | 120 | 8d, 4h | 8 | 4d, 20h |
| user 1 | 0 | 0d, 0h | 40 | 6d, 3h | 6 | 4d, 2h |
| user 2 | 0 | 0d, 0h | 60 | 16d, 6h | 0 | 0d, 0h |
| user 3 | 0 | 0d, 0h | 20 | 4d, 2h | 2 | 5d, 12h |
| IA Pool | 100 | 1d, 2h | 0 | 0d, 0h | 0 | 0d, 0h |
| Fraud | 0 | 0d, 0h | 140 | 10d, 6h | 11 | 6d, 3h |
| user 4 | 0 | 0d, 0h | 100 | 8d, 20h | 5 | 5d, 22h |
| user 5 | 0 | 0d, 0h | 40 | 14d, 3h | 6 | 6d, 12h |
| Money Laundering | 0 | 0d, 0h | 90 | 7d, 2h | 5 | 4d, 7h |
| user 6 | 0 | 0d, 0h | 50 | 7d, 7h | 4 | 5d, 6h |
| user 7 | 0 | 0d, 0h | 10 | 5d, 0h | 0 | 0d, 0h |
| user 8 | 0 | 0d, 0h | 30 | 6d, 12h | 1 | 8d, 3h |
| Total | 100 | 1d, 2h | 350 | 8d, 17h | 24 | 5d, 17h |

Kiosk | Alerts | Inquiry | Reports | Preferences | Logout

| Parameter | Description | Default | Min | Max |
|---|---|---|---|---|
| Conc Posn MVL | The minimum amount that must be concentrated in a single equity security to receive an alert. | $400K | $75K | $10M |
| Conc % | The percentage portfolio concentration in a single security required to receive an alert. This figure is computed by comparing market value of the holdings in the concentrated security to the total cash and security value. | 80% | 40% | 100% |
| Equity % | The equity percentage at or below which an account can be considered for an alert. | 40% | 0% | 90% |
| Accts on Margin | For household-level alerts, the minimum number of accounts in the household that must be trading on margin (i.e., have an equity percentage less than 100) and be concentrated in the same security as the household in order to receive an alert. | 2 | 2 | 10 |
| % Change | The percent change in the direction of interest that must occur for a situation to be considered significantly different from the previous month. If this occurs, an alert will be generated even if the account/household met the criteria during the previous month. | 15% | 0% | 100% |

FIG. 22

| Parameter | Description | Default | Min | Max |
|---|---|---|---|---|
| Low-Pr Sec MVL | The minimum aggregate market value in low-priced equities required to receive an alert. | $400K | $75K | $10M |
| Low-Pr Sec Conc % | The percentage portfolio concentration in low-priced equities required to receive an alert. This figure is computed by comparing low-priced security MVL to the total cash and security value. | 80% | 10% | 100% |
| % Change | The percent change in the direction of interest that must occur for a situation to be considered significantly different from the previous month. If this occurs, an alert will be generated even if the account/household met the criteria during the previous month. | 15% | 0% | 100% |

FIG. 23

| Parameter | Description | Default | Min | Max |
|---|---|---|---|---|
| Equity Share Qty | The quantity threshold below which an equity order may be handled by an auto-execution system. To qualify for an alert, each order in a series must be for less than this threshold, and the cumulative quantity must be for more than this threshold. | 2,001 | 2 | 100,000 |
| Equity Time Limit | The total time span (in seconds) within which a series of equity orders must be entered to qualify for an alert. | 30 | 2 | 18,000 |
| Option Contract Qty | The quantity threshold below which an option order may be handled by an auto-execution system. To qualify for an alert, each order in a series must be for less than this threshold, and the cumulative quantity must be for more than this threshold. | 21 | 2 | 10,000 |
| Option Time Limit | The total time span (in seconds) within which a series of option orders must be entered to qualify for an alert. | 15 | 2 | 18,000 |

FIG. 24

| Parameter | Description | Default | Min | Max |
|---|---|---|---|---|
| Min Before Mkt Close | The period of time (in minutes) before the end of regular trading hours in which an order may be considered for a Marking the Close alert. | 2 | 1 | 6 |
| Posn / Trd Qty Ratio | The minimum position—expressed as a multiple of the end-of-market trade quantity—that must be held in a margin (type 2 or 6) account to be considered a possible situation of interest. | 20 | 2 | 1,000 |
| % Pts Over Mgn Maint | For the account with a substantial position in the security of interest, the maximum number of percentage points by which the account's ending equity percentage may exceed its maintenance requirement (normally 35%). | 5% | 1% | 40% |

FIG. 25

| Parameter | Description | Default | Min | Max |
|---|---|---|---|---|
| Improper Short Trd # | The number of improper short sales an account must make over the course of one month to qualify for an alert. | 3 | 1 | 100 |

FIG. 26

| Parameter | Description | Default | Min | Max |
|---|---|---|---|---|
| Change from Market % | The percentage factor by which a possible extended-hours cross-trade in a security must deviate from both the recent closing price and the previous execution price for the security. | 15% | 1% | 1,000% |
| Mkt Moving Trend # | The number of ensuing executions in the same price range as the cross-trade (or further away from the recent closing price) that will be interpreted as a market-moving trend. If such a trend occurs, an alert will not be generated on the cross-trade. | 3 | 1 | 10,000 |
| Similar Range % | The percent range around the cross-trade price within which ensuing trades will be considered "similarly priced." This is used to evaluate market trends—if enough trades have a similar price or are further from the closing price, a trend has occurred. | 5 | 0 | 100 |

*FIG. 27*

| Parameter | Description | Default | Min | Max |
|---|---|---|---|---|
| Act vs Exp Ratio | For a representative's activity in a particular security, the ratio of the actual versus expected number of unsolicited orders necessary to qualify for an alert. | 4 | 2 | 100 |
| Side of Market % | For a representative's activity in a particular security, the percentage of the customer orders that must be on one side of the market (either Buy or Sell) in order to qualify for an alert. | 75% | 60% | 100% |
| Min Ords - Svc Tm | For representatives working in call centers or on service teams, the minimum number of orders that must be entered on one side of the market for a particular security in order to be considered for an alert. | 20 | 4 | 100 |
| Min Ords - Br Rep | For representatives working in branch offices, the minimum number of orders that must be entered on one side of the market for a particular security in order to be considered for an alert. | 8 | 4 | 100 |
| Min Accts - Svc Tm | For representatives working in call centers or on service teams, the minimum number of distinct customer accounts from which the representative must receive orders for a particular security in order to be considered for an alert. | 10 | 1 | 100 |
| Min Accts - Br Rep | For representatives working in branch offices, the minimum number of distinct customer accounts from which the representative must receive orders for a particular security in order to be considered for an alert. | 4 | 1 | 100 |
| Solicited Trades | The number of solicited orders that a representative must enter for a particular account to be considered a possible situation of interest. The representative must meet the criteria for solicited and unsolicited orders within the prescribed timeframe. | 2 | 1 | 50 |
| Unsolicited Trades | The number of unsolicited orders that a representative must enter for a particular account to be considered a possible situation of interest. The representative must meet the criteria for solicited and unsolicited orders within the prescribed timeframe. | 2 | 1 | 50 |
| Total Days | The total time span (in days) within which the representative must enter the solicited and unsolicited orders for a particular customer. | 1 | 1 | 14 |

FIG.28

| Parameter | Description | Default | Min | Max |
|---|---|---|---|---|
| Hrs b/t Trades | The maximum amount of time that may transpire between an employee entering a customer order and the employee placing a similar trade in his/her account. The time is expressed in market hours (i.e., 6.5 hours equals one business day). | 13 | 0.1 | 13 |
| Cust Eqty Shr Qt | The share quantity at or above which a customer's equity order can be considered for a shadowing alert. The customer trade must meet the minimum threshold in terms of share quantity or principal amount. | 100 | 0 | 1M |
| Cust Eqty Prin Amt | The principal amount at or above which a customer's equity order can be considered for a shadowing alert. The customer trade must meet the minimum threshold in terms of share quantity or principal amount. | $2K | $0 | $10M |
| Cust Optn Cntr Qt | The contract quantity at or above which a customer's option order can be considered for a shadowing alert. The customer trade must meet the minimum threshold in terms of quantity or principal amount. | 0 | 0 | 10,000 |
| Cust Optn Prin Amt | The principal amount at or above which a customer's option order can be considered for a shadowing alert. The customer trade must meet the minimum threshold in terms of quantity or principal amount. | $0 | $0 | $1M |
| Emp Eqty Shr Qt | The share quantity at or above which an employee's equity order can be considered for a shadowing alert. The employee trade must meet the minimum threshold in terms of share quantity or principal amount. | 100 | 0 | 1M |
| Emp Eqty Prin Amt | The principal amount at or above which an employee's equity order can be considered for a shadowing alert. The employee trade must meet the minimum threshold in terms of share quantity or principal amount. | $2K | $0 | $10M |
| Emp Optn Cntr Qt | The contract quantity at or above which an employee's option order can be considered for a shadowing alert. The employee trade must meet the minimum threshold in terms of quantity or principal amount. | 0 | 0 | 10,000 |
| Emp Optn Prin Amt | The principal amount at or above which an employee's option order can be considered for a shadowing alert. The employee trade must meet the minimum threshold in terms of quantity or principal amount. | $0 | $0 | $1M |
| Hrs b/t Trades - CC | The maximum amount of time between a control customer trade (involving the security in which he/she has a controlling role) and an employee order for a similar security. The time is expressed in market hours (i.e., 6.5 hours equals one business day). | 13 | 0.1 | 13 |

Continued from 29A

...

| Parameter | Description | Default | Min | Max |
|---|---|---|---|---|
| Ctrl Cust Eq Shr Qt | The minimum share quantity required for a control customer's order (involving the security in which he/she has a controlling role) to be considered a candidate for a shadowing alert. The trade can also qualify if it meets the Prin threshold. | 5000 | 0 | 1M |
| Ctrl Cust Eq Prin | The minimum principal amount required for a control customer's order (involving the security in which he/she has a controlling role) to be considered a candidate for a shadowing alert. The trade can also qualify if it meets the Shr Qt threshold. | $100K | $0 | $10M |
| Ctrl Cust Op Cntr Qt | The minimum contract quantity required for a control customer's option order (involving the security in which he/she has a controlling role) to be considered a candidate for a shadowing alert. The trade can also qualify if it meets the Prin threshold. | 50 | 0 | 10,000 |
| Ctrl Cust Op Prin | The minimum principal amount required for a control customer's option order (involving the security in which he/she has a controlling role) to be considered a candidate for a shadowing alert. The trade can also qualify if it meets the Cntr Qt threshold. | $50K | $0 | $1M |
| Emp Eq Shr Qt - CC | For alerts involving the shadowing of a control customer order not entered by the employee, the minimum share quantity required for an employee's equity order to be considered in an alert. The trade can also qualify if it meets the Prin threshold. | 100 | 0 | 1M |
| Emp Eq Prin - CC | For alerts involving the shadowing of a control customer order not entered by the employee, the principal amount required for an employee's equity order to be considered in an alert. The trade can also qualify if it meets the Shr Qt threshold. | $2K | $0 | $10M |
| Emp Op Cntr Qt - CC | For alerts involving the shadowing of a control customer order not entered by the employee, the minimum contract quantity required for an employee's option order to be considered in an alert. The trade can also qualify if it meets the Prin Amt threshold. | 0 | 0 | 10,000 |
| Emp Op Prin - CC | For alerts involving the shadowing of a control customer order not entered by the employee, the principal amount required for an employee's option order to be considered in an alert. The trade can also qualify if it meets the Cntr Qt threshold. | $0 | $0 | $1M |

FIG.29B

| Parameter | Description | Default | Min | Max |
|---|---|---|---|---|
| Seconds b/t Orders | The maximum amount of time that may transpire between an employee placing a trade in his/her account ant the employee entering a customer or firm account order for a similar security. The time is expressed in seconds. The orders must occur during the same business day. | 900 | 1 | 23,400 |
| Cust Eq Ord Shr Qty | The share quantity at or above which a customer or proprietary account equity order may be considered a candidate for front-running. | 500 | 0 | 1,000,000 |
| Cust Op Ord Cntr Qty | The contract quantity at or above which a customer or proprietary account option order may be considered a candidate for front-running. | 5 | 0 | 100,000 |
| Cust Bd Ord Prin Amt | The principal amount at or above which a customer or proprietary account bond order may be considered a candidate for front-running. | $25K | $0 | $10M |
| Cust Ot Ord Prin Amt | The principal amount at or above which a customer or proprietary account order for an "other" security type (i.e., one that is not classified as an equity, option, bond, mutual fund, money market, or CD) may be considered a candidate for front-running. | $25K | $0 | $10M |
| Emp Eq Ord Shr Qty | The share quantity at or above which an employee's equity order may be considered in a front-running alert. | 100 | 0 | 1,000,000 |
| Emp Op Ord Cntr Qty | The contract quantity at or above which an employee's option order may be considered in a front-running alert. | 1 | 0 | 100,000 |
| Emp Bd Ord Prin Amt | The principal amount at or above which an employee's bond order may be considered in a front-running alert. | $5K | $0 | $10M |
| Emp Ot Ord Prin Amt | The principal amount at or above which an employee's order for an "other" security type (i.e., one that is not classified as an equity, option, bond, mutual fund, money market, or CD) may be considered in a front-running alert. | $5K | $0 | $10M |

*FIG. 30*

| Parameter | Description | Default | Min | Max |
|---|---|---|---|---|
| Time Ahead Large Ord | The amount of time (in seconds) within which an employee's order must precede a large order to be considered a possible situation of interest. | 360 | 1 | 3,600 |
| Time After Large Ord | The amount of time (in seconds) following a large order within which an employee must place a trade opposite to the one he/she made ahead of the large order. All orders involved in the possible front-running situation must take place on the same business day. | 7,200 | 1 | 2,400 |
| Employee Profit | The net profit that the employee must realize from the trades surrounding the large order. | $100 | ($10K) | $10K |
| Low Vol Eq Shr Qty | For non-heavily-traded equities, the share quantity at or above which an order is considered large enough to be a candidate for front-running. The order must meet the minimum threshold in terms of either share quantity or principal amount. | 5,000 | 2,500 | 1,000,000 |
| Low Vol Eq Prin Amt | For non-heavily-traded equities, the principal amount at or above which an order is considered large enough to be a candidate for front-running. The order must meet the minimum threshold in terms of either share quantity or principal amount. | $50K | $25K | $10M |
| High Vol Eq Shr Qty | For heavily traded equities, the share quantity at or above which an order is considered large enough to be a candidate for front-running. The order must meet the minimum threshold in terms of either share quantity or principal amount. | 25,000 | 2,500 | 1,000,000 |
| High Vol Eq Prin Amt | For heavily traded equities, the principal amount at or above which an order is considered large enough to be a candidate for front-running. The order must meet the minimum threshold in terms of either share quantity or principal amount. | $250K | $25K | $10M |
| Option Contract Qty | The contract quantity at or above which an option order is considered large enough to be a candidate for front-running. | 5 | 1 | 100,000 |
| Bond Prin Amt | The principal amount at or above which a bond order is considered large enough to be a candidate for front-running. | $50K | $25K | $10M |

*FIG. 31*

| Parameter | Description | Default | Min | Max |
|---|---|---|---|---|
| % Security Pr Change | The percentage change relative to the previous day's close that must be observed for a security to be a candidate for an insider trading alert. | 15% | 10% | 1,000% |
| % Pr Mvmt Attained | The percentage of the price differential —computed by comparing the current closing price to the previous day's closing price—that an employee must manage to attain to be considered for an insider trading alert. | 50% | 100% | 0% |

FIG. 32

| Parameter | Description | Default | Min | Max |
|---|---|---|---|---|
| % Orig Sec Sold | For the mutual fund(s) the customer switched out of, the percentage of the buys during the past 6 months that were sold as part of the switch trade(s). | 25% | 1% | 100% |

*FIG. 33*

| Parameter | Description | Default | Min | Max |
|---|---|---|---|---|
| Hot IPO Defn - $ Chg | The absolute price increase— measured from the initial trading price to the closing price—at or above which an IPO will be considered "hot." An IPO can qualify as "hot" by meeting the absolute or percentage threshold. | $2 | $0 | $100 |
| Hot IPO Defn - % Chg | The percentage price increase— measured from the initial trading price to the closing price—at or above which an IPO will be considered "hot." An IPO can qualify as "hot" by meeting the absolute or percentage threshold. | 10% | 1% | 1,000% |
| % Alloc to Sub - Abs | The percentage allotment of IPO shares to a single subaccount that will automatically be considered disproportionate, regardless of how the subaccount's allocation compares to its expected allotment. | 25% | 1% | 100% |
| % Alloc to Sub - Min | The percentage allotment of IPO shares to a single subaccount that may be considered disproportionate, if the subaccount's allocation also exceeds its expected allotment by more than a specified ratio. | 10% | 1% | 100% |
| Ratio Act vs Exp Qty | The allocation of IPO shares to a subaccount—measured as a multiple of its expected allotment—that may be considered disproportionate, if the percentage of shares allocated to the subaccount also exceeds a minimum parameter. The expected allocation is based on the size of the subaccount relative to the total assets managed by the IA. | 5 | 1 | 100 |

*FIG. 34*

| Parameter | Description | Default | Min | Max |
|---|---|---|---|---|
| # Fav/Unfav Day Trds | The minimum number of "winning" or "losing" day-trade block allocations (i.e., the concurrent allotment of a buy and a sell) that a subaccount must receive over the course of a month to establish a pattern of favorable or unfavorable treatment by the IA. | 4 | 1 | 100 |
| % Day Trds Same Side | The percentage of the "winning" or "losing" day-trade block trade allocations that must have the end result (i.e., must be favorable or unfavorable) for the subaccount involved to establish a pattern of unequal treatment by the IA. | 80% | 50% | 100% |
| Net P&L Day Trds - $ | The minimum net amount a subaccount must gain or lose as a result of day-trade block trade allocations to be considered for an alert. | $1K | $1 | $1M |
| Ratio Act/Exp DT P&L | The level of gains or losses from block day-trades for a subaccount— measured as a multiple of its expected gain/loss—that may be of interest. The expected P&L is based on the size of the subaccount relative to the total assets managed by the IA. | 4 | 0 | 100 |
| # Fav/Unfav Trds | The minimum number of "winning" or "losing" block trade allocations that a subaccount must receive over the course of a month to establish a pattern of favorable or unfavorable treatment by the IA. | 8 | 1 | 100 |
| % Trds Same Side | The percentage of the "winning" or "losing" block trade allocations that must have the end result (i.e., must be favorable or unfavorable) for the subaccount involved to establish a pattern of unequal treatment by the IA. | 80% | 50% | 100% |
| Net P&L Trds - $ | The minimum net amount a subaccount must gain or lose as a result of block trade allocations to be considered for an alert. | $1K | $1 | $1M |
| Ratio Act/Exp P&L | The level of gains or losses from block trades for a subaccount—measured as a multiple of its expected gain/loss— that may be of interest. The expected P&L is based on the size of the subaccount relative to the total assets managed by the IA. | 4 | 0 | 100 |

*FIG. 35*

| Parameter | Description | Default | Min | Max |
|---|---|---|---|---|
| % Conc Level | The percentage of assets that must be held in a single equity position for an account to be classified as "concentrated." | 50% | 1% | 100% |
| % Subs w/Conc Posns | The percentage of IA subaccounts that must have a concentrated position to create an IA-level alert. | 50% | 1% | 100% |
| # HHs w/Conc Posns | The number of distinct household-security combinations (among the subaccounts for an IA) that must have a concentrated position to create an IA-level alert. | 5 | 1 | 1,000 |

*FIG. 36*

METHOD AND SYSTEM FOR THE PROTECTION OF BROKER AND INVESTOR RELATIONSHIPS, ACCOUNTS AND TRANSACTIONS

RELATED APPLICATIONS AND CLAIM OF PRIORITY

This application claims priority to, and incorporates by reference, U.S. provisional patent application No. 60/453,112, filed Mar. 7, 2003.

FIELD OF THE INVENTION

The present invention relates generally to computer-implemented behavior detection methods and systems. More particularly, the present invention relates to behavior detection methods and systems that determine whether data that is representative of behavior fits a pre-determined advanced scenario that represents a risk to a financial brokerage or its customer investors.

BACKGROUND OF THE INVENTION

As a result of the market crash of 1929, the U.S. Federal Government enacted legislation aimed at protecting investors and requiring greater due diligence among professionals in the financial industries through passage of the 1934 Securities Exchange Act. This Act also led to the creation of the Securities and Exchange Commission (SEC) which creates and enforces rules and requirements for both individual investors as well as financial institutions in maintaining system integrity and providing "equal footing" for all participants. The SEC has further authorized industry associations, such as the National Association of Securities Dealers (NASD), which self-regulates its members. Currently, the NASD regulates over 5,300 brokerage firms and 664,000 representatives. As a result of both NASD and SEC rules and requirements, much greater protection and fiduciary responsibility has been put in place. One of the key contributing factors to the 1929 market crash was the highly leveraged financial position of many individuals based upon the recommendation of their financial advisor or broker. Unsuitable investments were often selected for these investors such as high-risk, high-volatile securities for retired individuals, living on a fixed income, with a limited asset base who did not understand the potential downside of such a highly leveraged position. Furthermore, leverage (commonly referred to as margin) positions enabled a small investment to control a much larger total investment by borrowing against the equity. In many cases, it was possible to control as much as 20 times the assets based on the investment. This highly leveraged strategy generated significant returns when the underlying asset appreciated, but it generated significant loses when the underlying asset depreciated. Once the stock market started to correct, it gained in speed and severity as investors had to sell assets. This further increased selling pressure causing a downward spiral in asset values. As a result, many individual investors found themselves with outstanding margin loans that they then had to repay. The 1934 Act was intended to remedy many of the underlying factors that contributed to the market crash. Stricter guidelines for margin accounts was implemented as well as placing greater responsibility on financial professionals to follow specific guidelines when soliciting or selling securities to individuals. These financial professionals were assigned a fiduciary responsibility to "know their customer" and offer only those securities that would meet the individual's financial objectives based on their income, asset base, knowledge, and experience in the markets. Financial professionals were further required to obtain specific licenses in order to practice in the industry to ensure a minimum level of understanding, training, and market knowledge.

During the $20^{th}$ century, there was an unprecedented level of growth in the financial markets. Stock ownership continues to reach new levels of participation with many investors investing directly through individual, brokerage, and retirement accounts in addition to managed investments such as mutual funds or insurance policies. Advances in technology and changes in legislation have resulted in a changed landscape from when the 1934 Act was first implemented. During the 1980s, a new category of brokerages emerged, that of discount brokers. Online brokerage firms then followed in the 1990s with the widespread use of the Internet. As such, it has become increasingly more difficult for financial professionals to "know their customer" and fulfill their fiduciary responsibilities. However, despite the changed industry, the fiduciary responsibilities remain in place. Financial institutions and representatives are still responsible for monitoring the investment strategies and practices of their customers in order to comply with the 1934 Act. In some cases, failure by financial institutions and/or representatives to "know their customer" and allow suitable investments to be acquired by investors has led lawsuits costing this sector millions of dollars in fees, penalties, and goodwill. Given the ongoing growth and expansion of the financial services sector, the number and types of lawsuits will continue to rise unless more sophisticated tools are provided that will enable the proactive management and protection of financial institutions, representatives, and customers.

SUMMARY OF THE INVENTION

The system and method presented allow for the automated detection of selected behaviors, events, and/or activities in order to protect financial advisors and investors. By applying carefully defined advanced scenario descriptions to sets of financial institution transaction data, alerts can be generated. These alerts provide an indication that the behavior, event, and/or activity of interest is taking place. Preferably, the alerts also provide links to the specific types of data that are indicative of the behavior of interest. The invention may analyze vast amounts of data in identifying behavior, events, and/or activities that may conflict with SEC or NASD regulations, or with internal policies, thereby enabling firms, representatives, and customers to receive greater protection and provide for strong marketplace integrity.

Accordingly, in a preferred embodiment, a computer-based method for generating alerts to a situation representing risk to a brokerage or its investors includes the steps of: (i) periodically receiving data having a first format from at least one source; (ii) transforming the data from the first format to a second format; (iii) retrieving an advanced scenario associated with the situation, wherein the advanced scenario defines one or more behaviors of interest that are indicative of said situation; (iv) using the advanced scenario to perform detection processing utilizing the advanced scenario on a dataset to detect the said situation. The situation is preferably a predetermined activity, and specifically, undesired activity relating to securities trading. The dataset is preferably a portion of the data having the second format, and it includes one or more events and entities. The situation is detected when the detection processing finds at least one instantiation of the situation in the dataset.

Optionally, the method may generate one or more alerts based on the discovery of one or more behaviors of interest. The method may also prioritize the behaviors of interest based on user-defined logic and values. It may also group the behaviors of interest, prioritize the groups, and generate one or more alerts based on the existence of groups or prioritized groups.

The method may be embodied in a computer program residing on a computer-readable medium.

BRIEF DESCRIPTION OF THE DRAWINGS

The accompanying drawings, which are incorporated in and form a part of the specification, illustrate preferred embodiments of the present invention and, together with the description serve to explain the principles of the invention. The embodiments illustrated in the drawings should not be read to constitute limiting requirements, but instead are intended to assist the reader in understanding the invention.

FIG. 7 is a representation of sequence matching.

FIG. 8 is a representation of outlier detection.

FIG. 14 illustrates a graphical user interface for a threshold definer.

FIG. 16 illustrates a graphical user interface for alert display, alert filtering and alert viewing.

FIG. 18 illustrates the lower half of a graphical user interface for viewing of alert detail.

FIG. 19 illustrates a graphical user interface for workload management.

FIG. 22 illustrates parameters for the Customers with Concentrated Positions in a Single Security scenario.

FIG. 23 illustrates parameters for the Customers with a Concentrated Position in Low-Priced Equities scenario.

FIG. 24 illustrates parameters for the Customers Who May Be Abusing Auto-Execution Systems scenario.

FIG. 25 illustrates parameters for the Customers Who May Be Marking the Close scenario.

FIG. 26 illustrates parameters for the Customers Who May Be Making Improper Short Sales scenario.

FIG. 27 illustrates parameters for the Customers Making Cross-Trades Away from the Market scenario.

FIG. 28 illustrates parameters for the Representatives Who May Be Encouraging Orders But Marking Them As Unsolicited scenario.

FIGS. 29A and 29B illustrate parameters for the Employees Shadowing a Customer Account scenario.

FIG. 30 illustrates parameters for the Possible Front-Running By Order-Taker scenario.

FIG. 31 illustrates parameters for the Possible Front-Running By Employee scenario.

FIG. 32 illustrates parameters for the Employees Trading On Insider Information scenario.

FIG. 33 illustrates parameters for the Mutual Fund Switch scenario.

FIG. 34 illustrates parameters for the IA IPO Allocations scenario.

FIG. 35 illustrates parameters for the IA Block Trade Allocations scenario.

FIG. 36 illustrates parameters for the IAs with Many Sub-accounts That Have Concentrated Positions scenario.

DETAILED DESCRIPTION OF PREFERRED EMBODIMENTS OF THE INVENTION

Figure 1:
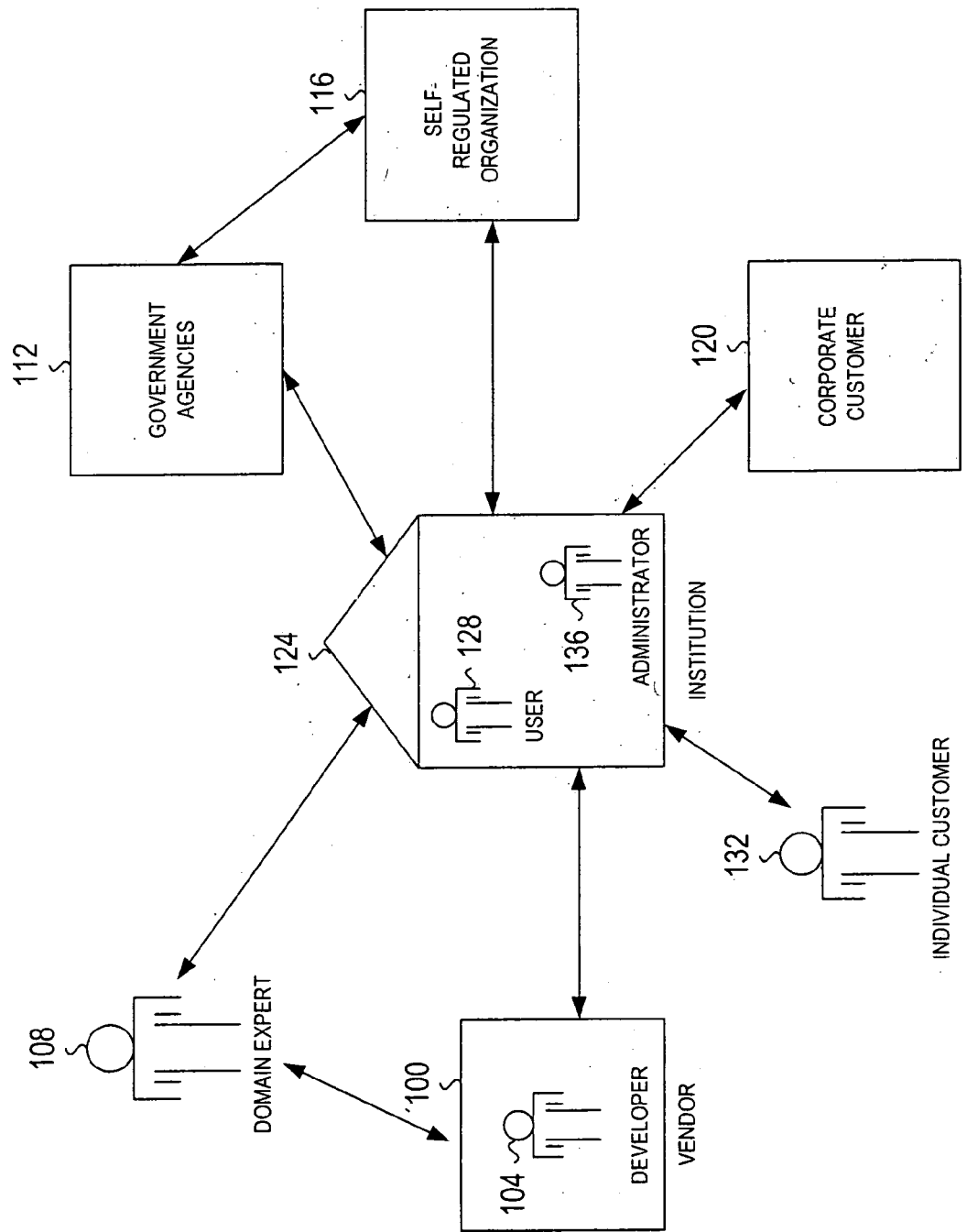
FIG. 1 illustrates a user-relationship diagram of and embodiment of the advanced scenario based alert generation and processing system.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. In addition, the drawings illustrate examples of preferred embodiments of the invention and should not be construed as limiting or requiring certain features.

FIG. 1 illustrates a user-relationship diagram for an embodiment of the advanced scenario based alert generation and processing system. As can be seen in FIG. 1, a vendor 100 with a developer 104 can work directly with a domain expert 108, institution 124, administrator 136 and/or user 128 in developing, creating, and implementing information based products and services. Domain expert 108 has, generally speaking, specialized knowledge about the application and can act as a subject matter expert. Administrator 136 and user 128 can monitor both individual customer 132 as well as a corporate customer 120. A self-regulated organization 116 develops rules and regulations that its members (e.g. institution 124) adhere to, either for preservation of the industry or to comply with government regulations.

As an example, institution 124 may be a US securities brokerage that services individuals as well as corporations. The Securities and Exchange Commission (SEC) requires that institution 124 perform self-monitoring, which it does by performing that monitoring according to the standards set by National Association of Securities Dealers (NASD), a self-regulated organization 116.

Institution 124 or self regulated organization 116 may be subject to regulation by a variety of government agencies 112, examples of which are the Internal Revenue Service (IRS), Federal Bureau of Investigation (FBI), U.S. Treasury, SEC, and Bureau of Citizenship and Services (BCIS). Institution 124 may be subject to and/or a member of self-regulating organization 116 such as professional or financial associations that provide operating guidelines for their members with the goal of being self-regulating as opposed to government regulated.

Understanding behaviors may be important to institution 124 for purposes of better understanding or protecting their customer, or for reporting certain behaviors to government agencies. Self-regulated organization 116 may also require its member institutions to perform a specific level and/or type of behavior monitoring in order to ensure that all members are compliant with the organization's rules.

Figure 2:
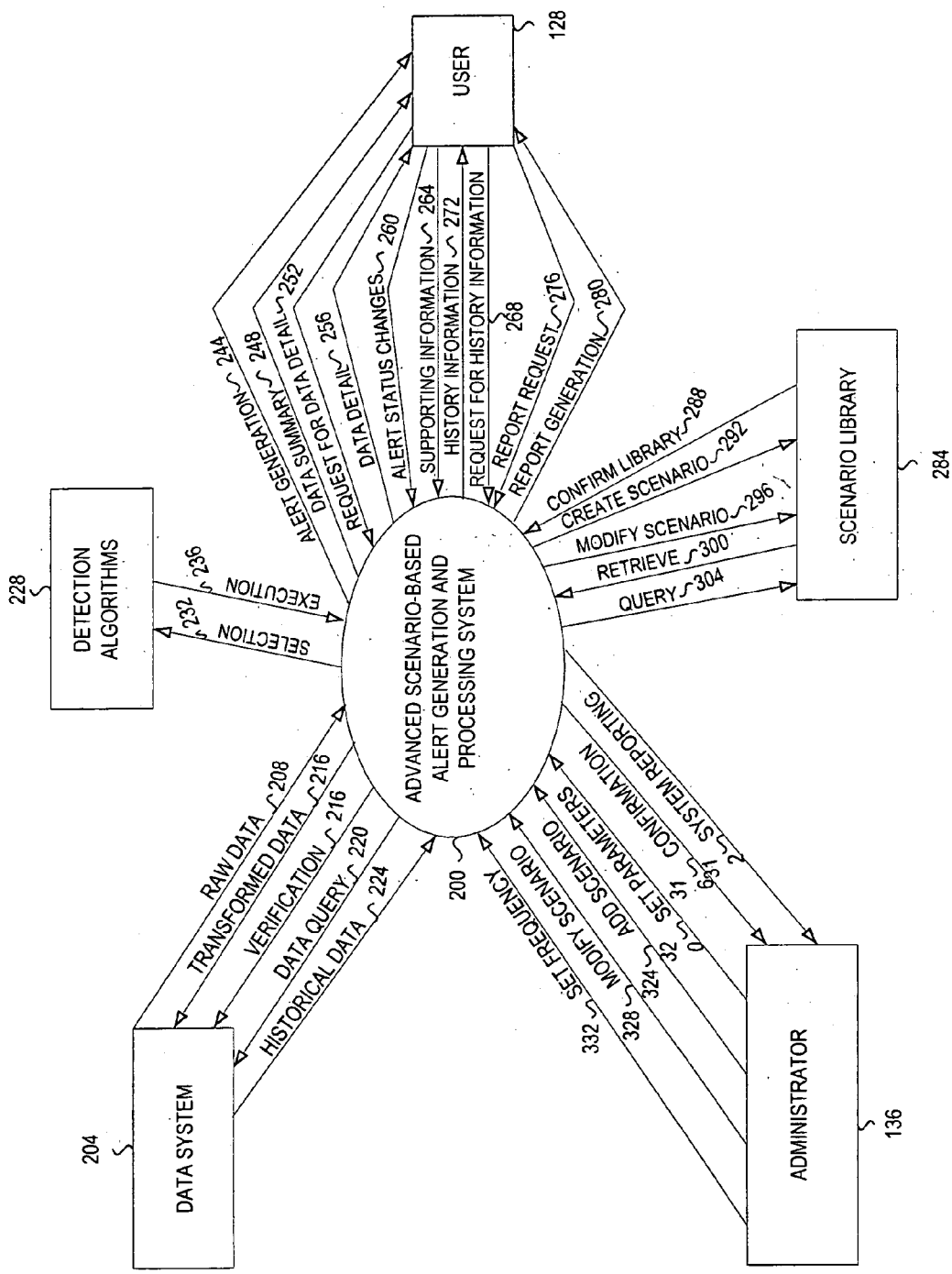
FIG. 2 represents a context diagram.

FIG. 2 illustrates a context-diagram for a preferred embodiment of the advanced scenario-based alert generation and processing system 200. The main elements of this environment include, but are not limited to, data system 204, detection algorithms 228, user 128, scenario library 284, and administrator 136.

In interfacing with the advanced scenario-based alert generation and processing system 200, the administrator 136 may set frequency 332 which determines the time and frequency that the advanced scenario-based alert generation and processing system 200 performs its advanced capabilities. Furthermore, the administrator 136 may modify scenario 328 that accesses an existing scenario from the scenario library 284 in order to make and save desired changes. Additional scenarios may be added by the administrator 136 through an add scenario 324 capability thereby allowing for continuous upgrading and enhancing of the advanced scenario-based alert generation and processing system 200. The administrator 136 may also set parameters 320 enabling greater flexibility and capability in detecting desired behaviors, transactions, or relationships across entities and events. The advanced scenario-based alert generation and processing system 200 is preferably capable of sending confirmation 316 of set frequency 332, modify scenario 328, add scenario 324, and set parameters 320. The advanced scenario-based alert generation and processing system 200 may also provide system reporting 312 which could include information such as error reporting, system performance, or other desired and relevant information.

Figure 9A:
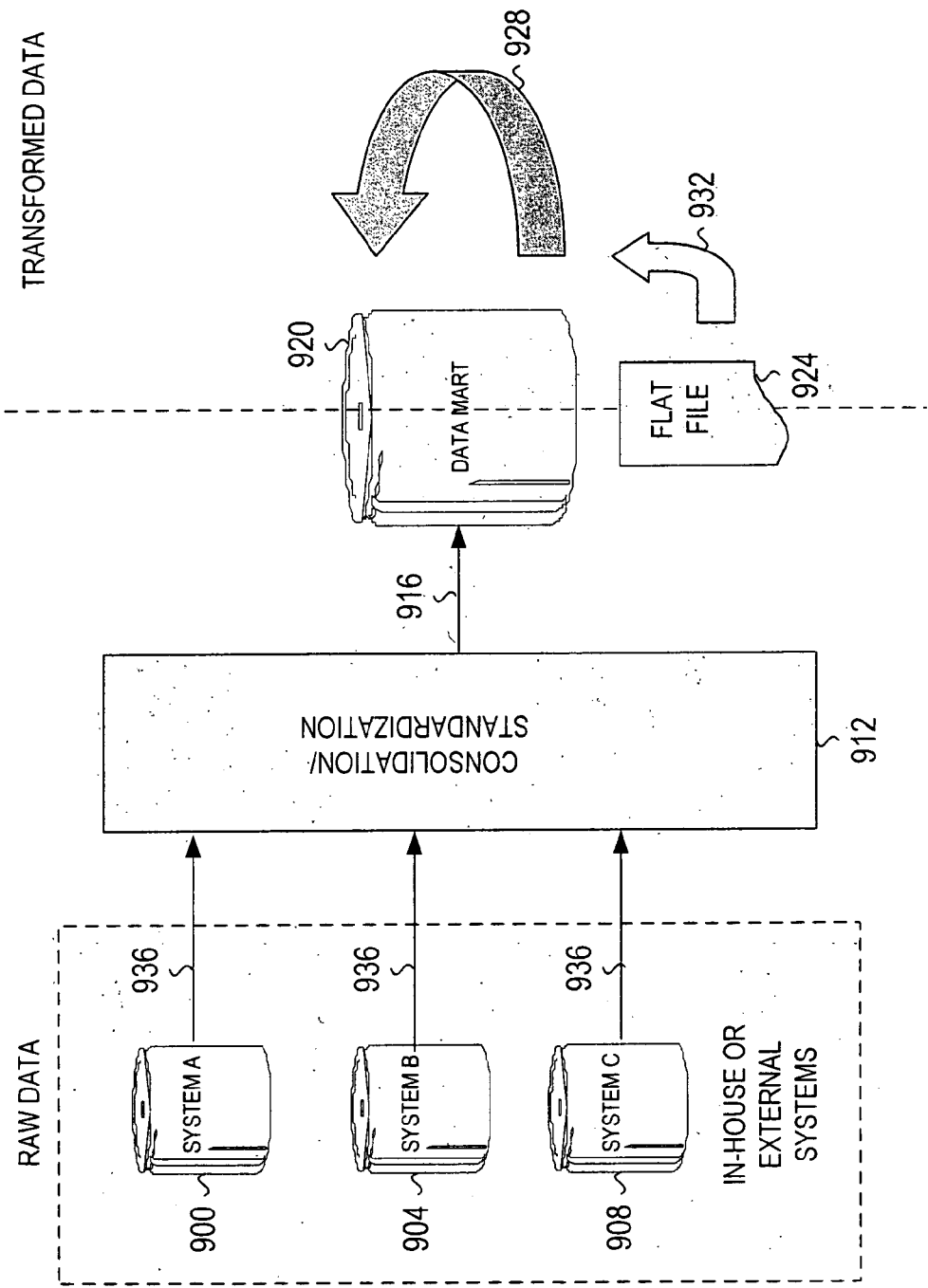
FIG. 9A represents a data transformation process.

The advanced scenario-based alert generation and processing system 200 can receive raw data 208 from the data system 204. The advanced scenario-based alert generation and processing system 200 may then transform the data and send back transformed data 212 to the data system 204. The process of transforming data is illustrated in FIG. 9A and described below in the text accompanying FIG. 9A. Preferably, the advanced scenario-based alert generation and processing system 200 may provide verification 216 of the data integrity through any of a variety of error detection processes that will be readily known to those skilled in the art. The advanced scenario-based alert generation and processing system 200 may then send a data query 220 to the data system 204 in which historical data 224 may be retrieved as input for the advanced scenario-based alert generation and processing system 200. Once the historical data 224 is available for the advanced scenario-based alert generation and processing system 200, then detection algorithms 228 may be accessed for selection 232 and execution 236 of the desired and appropriate algorithm.

Figure 6:
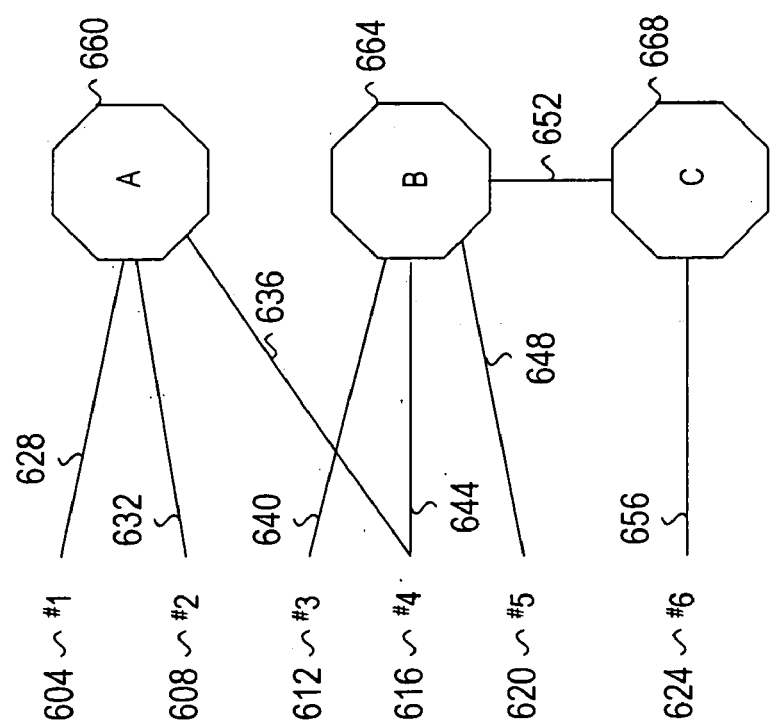
FIG. 6 is a representation of link analysis.

There are a variety of detection algorithms 228 which can be applied. The types of algorithms include, but are not limited to, link analysis, sequence matching, outlier detection, rule patterns, text mining, decision trees, and neural networks. Link analysis is an advanced behavior detection algorithm that performs an analysis of seemingly unrelated accounts, activities, events, and behaviors to determine what possible links and hidden relationships may exist. FIG. 6, which will be described in greater detail later in this document, is illustrative of link analysis. Sequence matching may be used to identify a range of events, behaviors, or activities in a pattern of relevant sequences. While a single event, behavior, or activity may not always be interesting, when compared to the position of such event, behavior, or activity within a larger context, certain interesting trends or sequences may be detected. FIG. 7, which will be described in greater detail later in this document, is illustrative of sequence matching. Outlier detection examines data values to determine specific events, behaviors, or activities that fall outside of a specified statistical range. A simplistic approach is to use regression modeling in identifying outliers, which are beyond a specified standard deviation. A more sophisticated approach is to identify outliers in the context of data clusters where multiple data clusters may exist rendering a regression model ineffective. FIG. 8, which will be described in greater detail later in this document, is illustrative of outlier detection. Rule pattern detection implements conditional statements when analyzing data, generally in the form of "if then" statements. Text mining algorithms examine the data for specific text phrases, sequences, or information that can be provided as inputs to a behavior detector. Decision trees and neural networks are related approaches that examine sequence of events, behaviors, or activities using logical rules or specific networks well known by those skilled in the art.

Additional algorithms may also be accessed by the advanced scenario-based alert generation and processing system 200 in identifying interesting behaviors, events, activities, or transactions. Once a detection algorithm has been selected, the advanced scenario-based alert generation and processing system 200 may then access the scenario library 284 to apply the relevant and appropriate scenario, in conjunction with the detection algorithm, to create matches of desired behaviors, activities, or events in a complex environment. The scenario library 284 may contain a plurality of advanced scenarios and basic scenarios in identifying activities, behaviors, or events of interest.

The advanced scenario-based alert generation and processing system 200 may send a query 304 to the scenario library 284 accessing a specific scenario. The scenario library 284 may then retrieve 300 the selected scenario and send it back to the advanced scenario-based alert generation and processing system 200. Based on the specific scenario retrieved, the advanced scenario-based alert generation and processing system 200 may then send a data query 220 to the data system 204 in which historical data 224 may be retrieved as input for the advanced scenario-based alert generation and processing system 200. In addition, the advanced scenario-based alert generation and processing system 200 may send to the scenario library 284 requests to modify scenario 296 or create scenario 292. The scenario library 284 may then confirm library 288 to the advanced scenario-based alert generation and processing system 200. The flexibility and capability to add or modify elements of the scenario library 284 and detection algorithms 228 allow the advanced scenario-based alert generation and processing system 200 to be continuously upgraded and dynamically maintained. Once the desired and appropriate detection algorithm has been selected and the desired and appropriate scenario applied, the advanced scenario-based alert generation and processing system 200 may process the data by creating an alert generation 244 that may be sent to the user 128. Furthermore, the advanced scenario-based alert generation and processing system 200 may send a data summary 248 as related to the alert generation 244 to the user 128 in order to provide immediate access to relevant information related to the detected activity, behavior, or circumstances. The user 128 may then send a request for data detail 252 to the advanced scenario-based alert generation and processing system 200 which may then provide additional, underlying data related to the data summary 248 and alert generation 244. The advanced scenario-based alert generation and processing system 200 may then send the data detail 256 to the user 128 based on the request for data detail 252.

This additional information, when combined with the original information received, allows the user 128 to elect an alert status change 260 which is transmitted back to the advanced scenario-based alert generation and processing system 200. Furthermore, the user 128 may provide supporting information 264 back to the advanced scenario-based alert generation and processing system 200. This supporting information 264 may include, but is not limited to, comments, findings, opinions, or other data in supporting the user 128 request to implement an alert status change 260. In addition, user 128 may request from the advanced scenario-based alert generation and processing system 200 additional historical information as captured in the request for historical information 268. This may provide the user 128 additional information in which to place the context of the alert generation 244. The advanced scenario-based alert generation and processing system 200 may then send to the user 128 the requested history information 272. Furthermore, the user 128 may send a report request 276 to the advanced scenario-based alert generation and processing system 200, which may then provide the desired information through report generation 280 back to the user 128.

Figure 4:
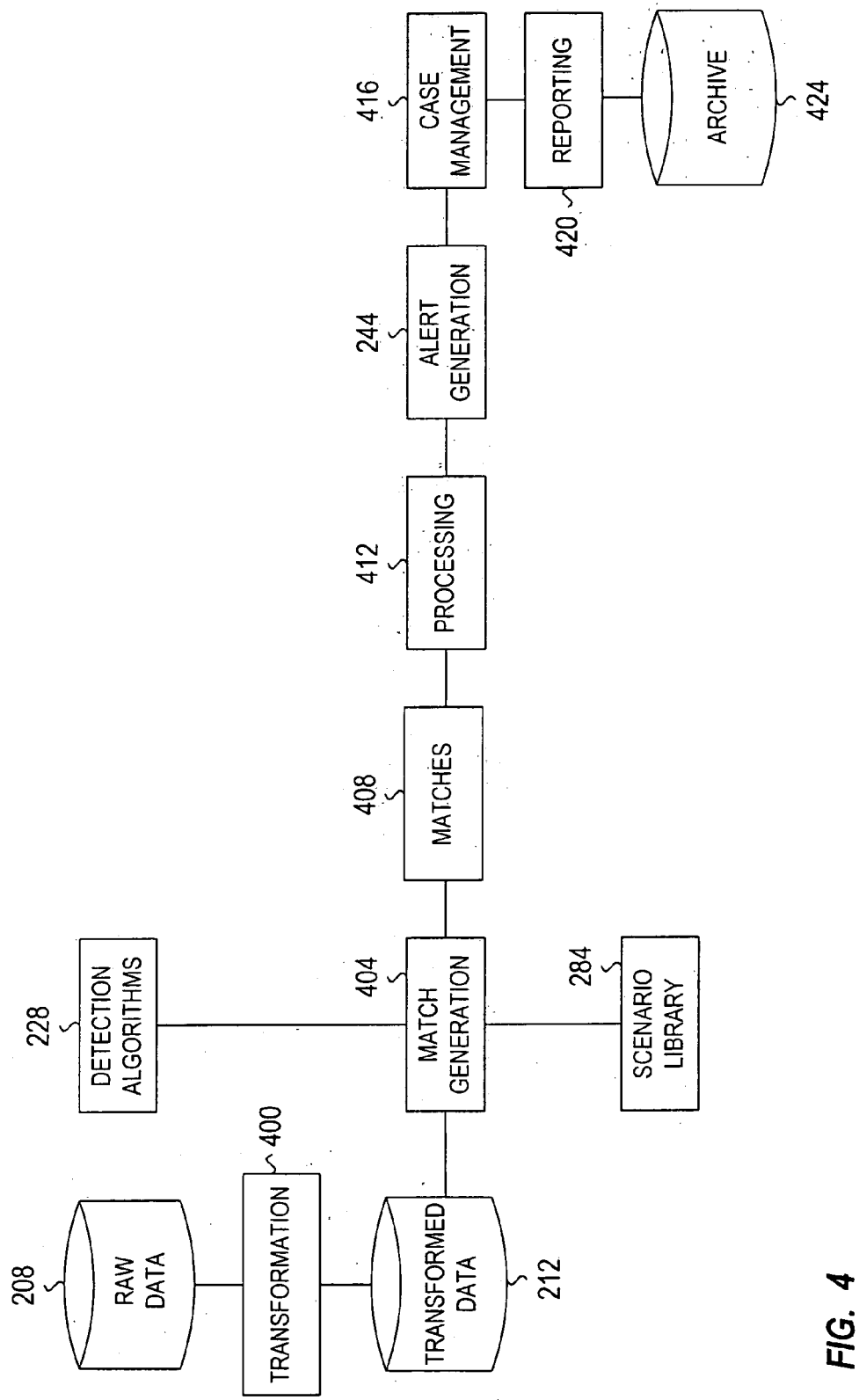
FIG. 4 is a block diagram representing an embodiment of the advanced scenario based alert generation and processing system.

FIG. 4 represents a block diagram of the advanced scenario based alert generation and processing system 200. Raw data 208 is converted through a transformation step 400, elements of which are described below and in FIG. 9A. The output of the transformation may be saved as transformed data 212. Match generation 404 may then access the transformed data 212, detection algorithms 228, and scenario library 284. The scenarios in scenario library 284 can be represented as parameters and logic that specifically relate to the behavior of interest. In one embodiment, these parameters and logic are coded in Extensible Markup Language (XML). In one embodiment match generation 404 is written in C++ and retrieves the parameters and logic from the XML representation in scenario library 284, allowing the detection algorithms written in C++ to operate on the transformed data. The match generation 404 then generates matches 408, which undergo processing 412 where they are grouped and prioritized. Preferably, processing 412 is a key component of the overall system. Incorporated in processing 412 is the ability to prioritize or weigh different elements of the activity, event, or behavior of interest. Alert generation 244 can receive processed (grouped and prioritized) matches from processing 412, and in one embodiment, store those matches as an XML file. In many cases, individually identified events, behaviors, or activities of interest may be relatively minor. However, when viewed within a broader context as part of other transactions, then the cumulative value becomes much greater than the individual elements. As such, a grouping of activities, events, and behaviors of interest provides an advanced capability not presently available. Furthermore, the prioritization allows for greater segmentation of the data so that matches with higher impact or importance receive greater attention or are more quickly considered.

Figure 20:
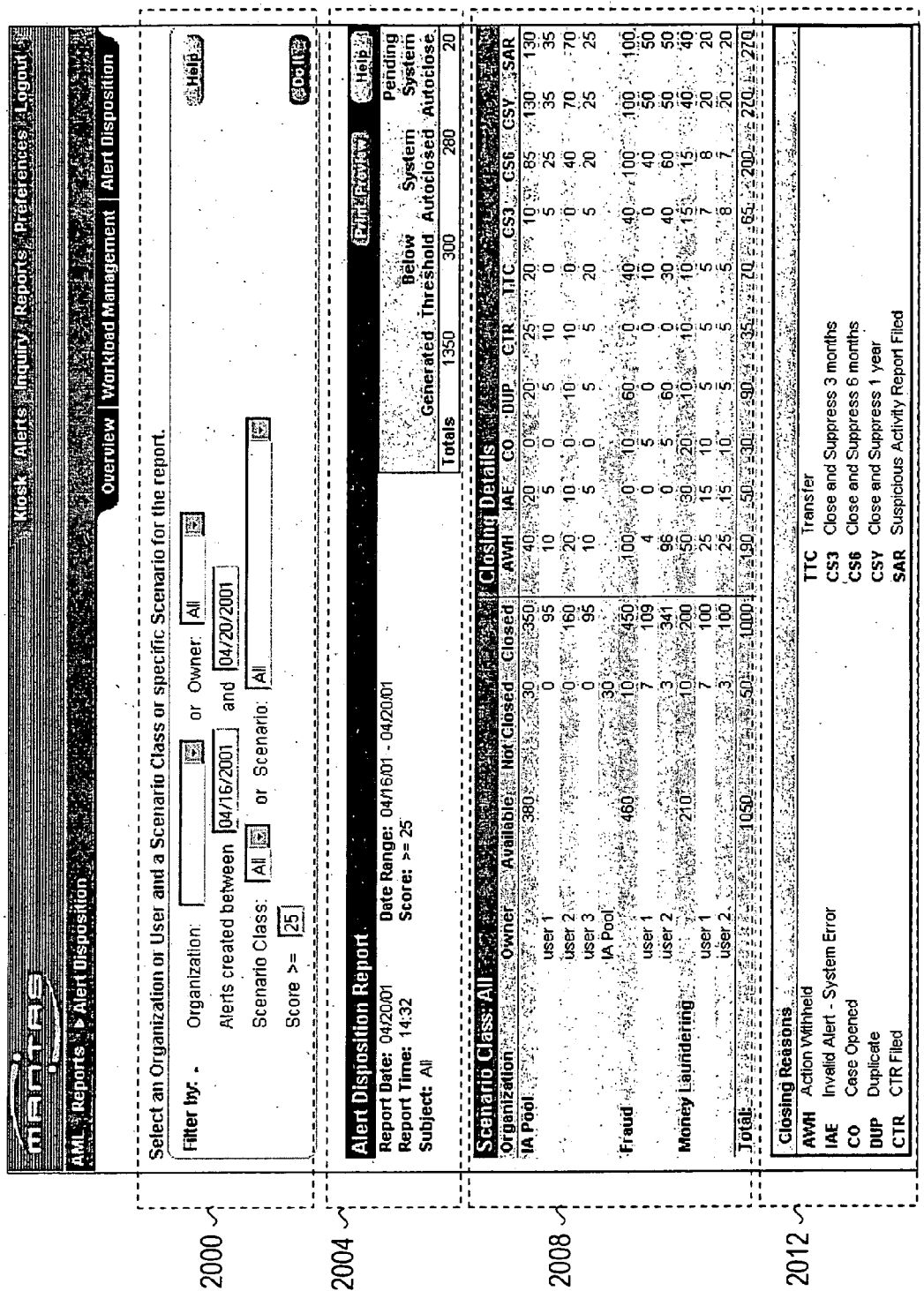
FIG. 20 illustrates a graphical user interface for alert disposition.

Referring again to FIG. 4 the alert generation 244 transfers relevant information regarding behaviors, activities, and events of interest into case management 416. In case management 416, the information is further reviewed, analyzed, and investigated. Case management 416 is a set of tools and user interfaces that allow alerts to be reviewed, analyzed, and investigated by a human operator. Case management 416 also allows a user 128 to enter data related to an alert, close an alert, refer an alert to another user, or perform other types of case management tasks on an individual alert. In one embodiment case management provides a user interface such as that shown in FIG. 16, including a high-level description of the alert. Case management 416 also supports the filtering of the alerts using, for example, the fields shown in filtering elements 1600. Case management 416 can also provide user interfaces such as those shown in FIGS. 17 and 18. When alerts are stored in an XML format, a number of commercially available case management tools can be used to access and assist a human in processing those alerts. Examples of commercially available case management tools include, but are not limited to, TightLink CIS 3™ and Syfact™. In one embodiment, a web-based application written in Java is used for case management 416. Additional information is saved and the alert is processed, at which point, the information is transferred to reporting 420 and later saved through in archive 424. Examples of the output of reporting 420 are illustrated in FIGS. 19 and 20 where workload management and alert dispositioning are shown respectively. A number of commercially available reporting tools can be used to report on workload management, dispositioning, and other areas of interest. Examples of commercially available case reporting tools include, but are not limited to Crystal Reports™ sold by Crystal Decisions, the product manufactured by Statewide Data Warehouse and sold under the product name Brio™, or the e.Reporting Suite™ offered by Actuate. In one embodiment, a web-based application written in Java is used for reporting 420. The ability to save the alert data and related workflow activities in archive 424 is beneficial because it allows the methodology used to create the alert data and the methodology used to establish workflow to be recalled and modified as necessary.

Representative code included herein includes sub-sections describing link analysis, sequence matching, outlier detection, and rules-based detection as it pertains to match generation 404. These sub-sections instruct the system to access transformed data 212, select detection algorithms 228 and apply the appropriate scenario library 284 in the match generation 404 process. Once the match generation 404 has been completed, then the next step in the advanced scenario-based alert generation and processing system 200 is the processing 412 of matches 408 identified in the match generation 404 sequence. Processing 412 includes the processes of prioritization, group, and alert prioritization of the matches 408. The prioritization sub-section in the representative code describes a computer-based approach for receiving match information and prioritization strategy logic. This sub-section then evaluates the matches 408 based in order to assign a ranking or prioritization which is an output of the advanced scenario-based alert generation and processing system 200. The grouping sub-section in the representative code describes a computer-based approach for accessing a set of prioritized matches and grouping strategy logic. The grouping process then evaluates prioritized matches and creates group associations based on the grouping strategy logic. The grouped prioritized matches form an output of the advanced scenario-based alert generation and processing system 200. The alert prioritization sub-section in the representative code describes a computer-based approach for receiving a set of grouped matches and alert prioritization strategy logic. The alert prioritization process then evaluates the grouped matches based on the alert prioritization strategy logic in order to assign an alert prioritization. The group matches can then be output based on alert prioritization by the advanced scenario-based alert generation and processing system 200 which would proceed on to the next step of alert generation 244.

Figure 16:
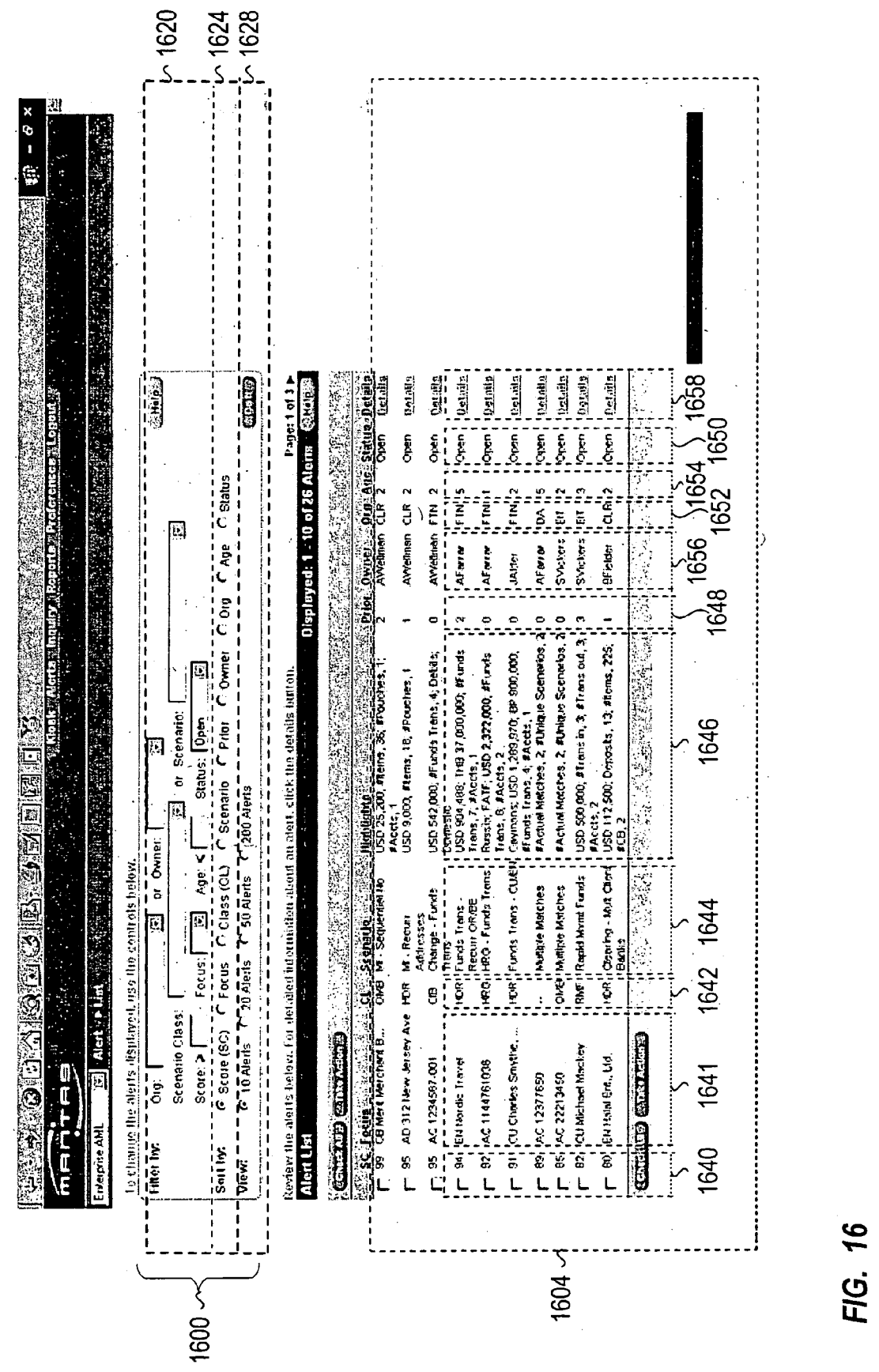

FIG. 16 is an illustration of a graphical user interface for alert display, alert filtering, and alert viewing. Prioritization column 1640 displays the numeric value associated with the alert prioritization. A user 128, domain expert 108, developer 104 or administrator 136 may modify the visual presentation of alerts based on the alert prioritization.

Figure 17:
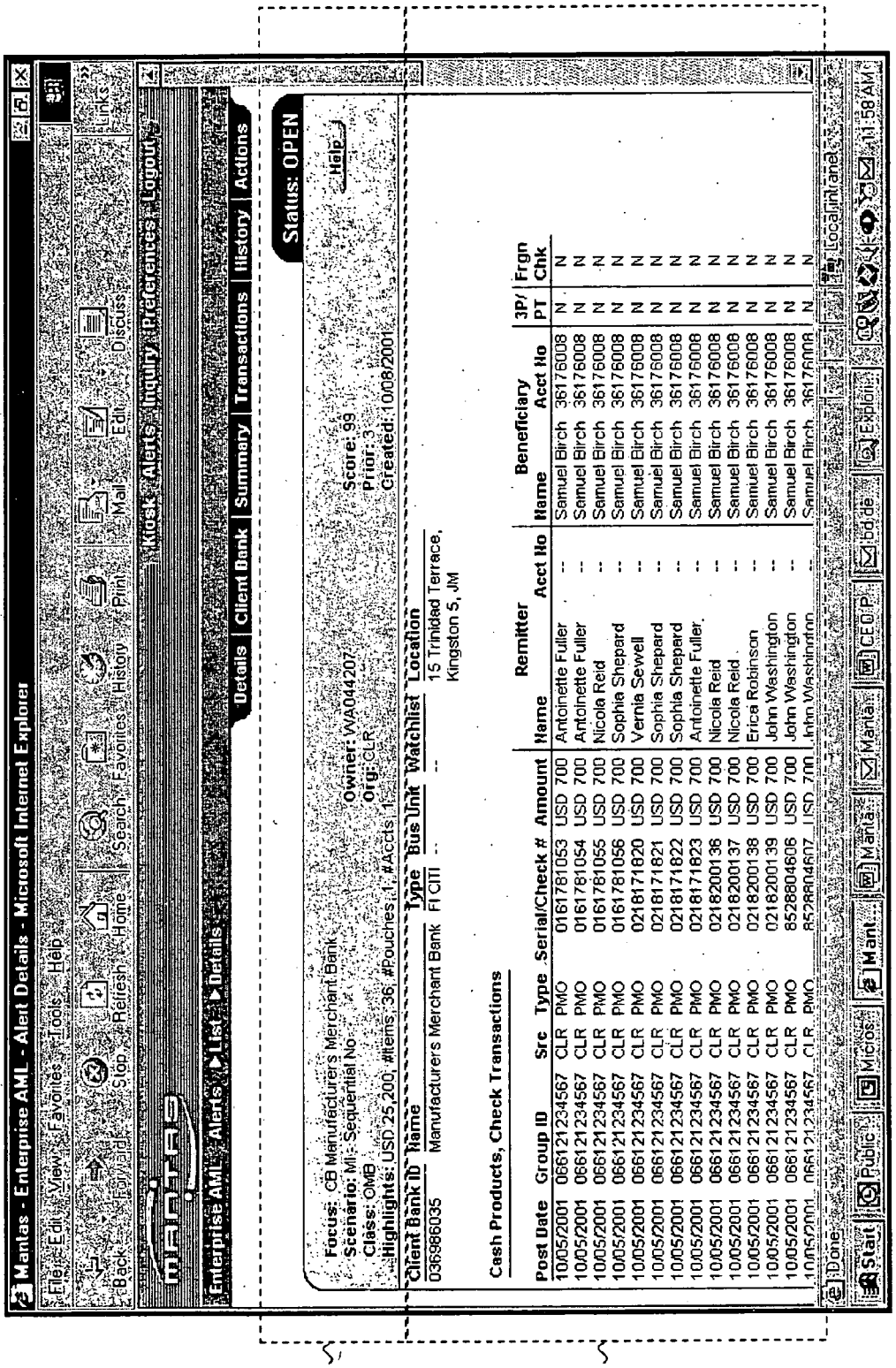
FIG. 17 illustrates the upper half of a graphical user interface for viewing of alert details.

FIGS. 17 and 18 are representative of a graphical user interface for display information related to case management 416. FIGS. 19 and 20 are representative of a graphical user interface displaying information related to reporting 420. The representative code that facilitates these processes can be written in a variety of computer languages including, but not limited to, Java, C, and C++.

Figure 5:
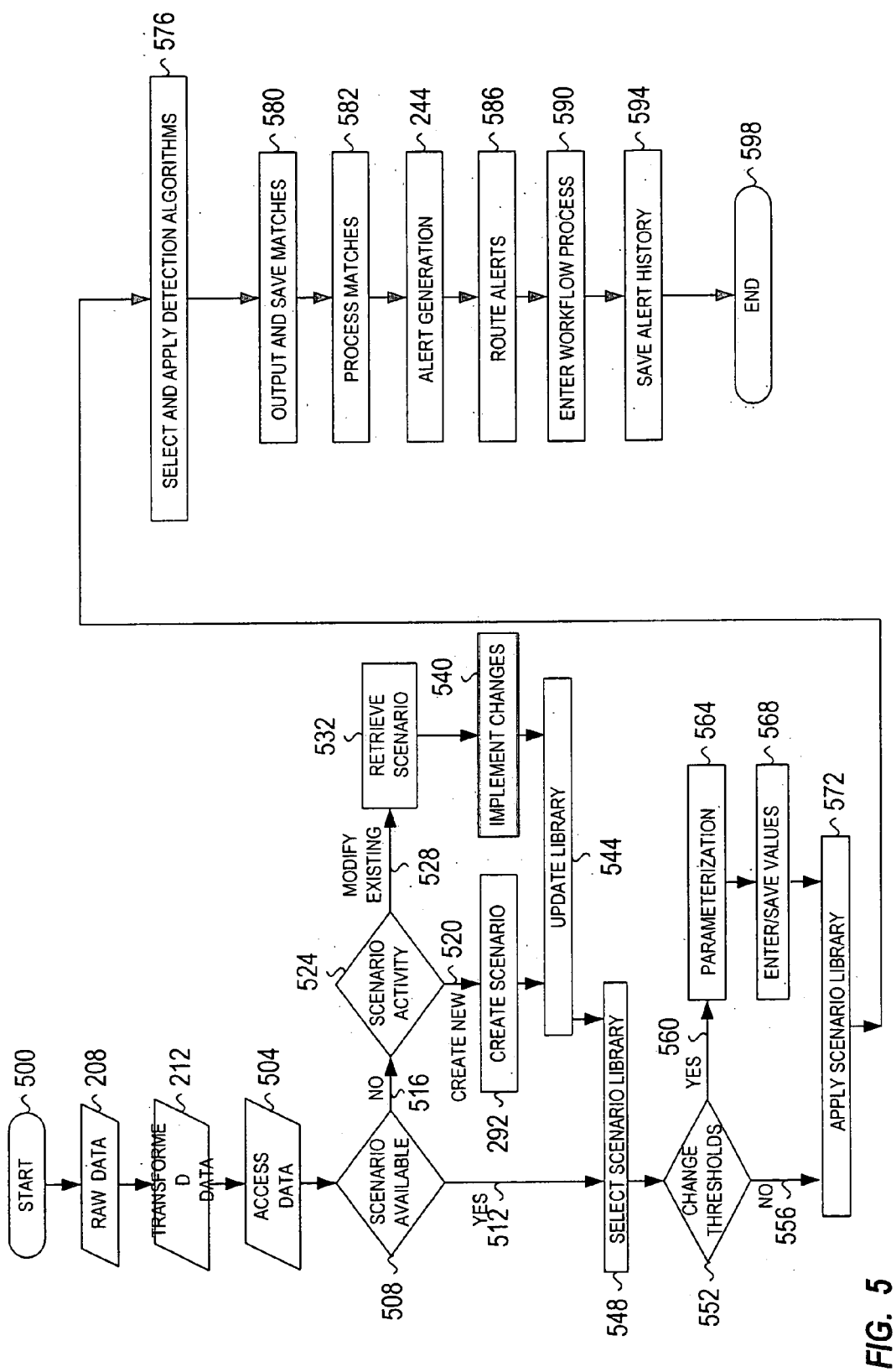
FIG. 5 is a flowchart representing an embodiment of the advanced scenario based alert generation and processing system.

FIG. 5 illustrates a flow diagram of the elements of the advanced scenario-based alert generation and processing system 200. Upon system start 500, raw data 208 is accessed by the system which is then transformed resulting in stored transformed data 212. The advanced scenario-based alert generation and processing system 200 may then access data 504, which is included in the match generation 404 process. A scenario available test 508 may then be performed resulting in a scenario available result 512 or a scenario not available result 516. A decision may be made as to whether or not a scenario available 508 exists. If a scenario available test 508 results in a scenario available result 512, then the system may select scenario library 548. If the scenario available test 508 results in a scenario not available result 516, then another decision point scenario activity test 524 may be performed to consider whether to modify 528 an existing scenario or create a new 520 scenario. If decision point scenario activity test 524 results in a new scenario being created 520, then the flow proceeds to the create scenario process 292. Once the new scenario has been created, the library is updated 544 and the system selects a scenario library 548.

Figure 13:
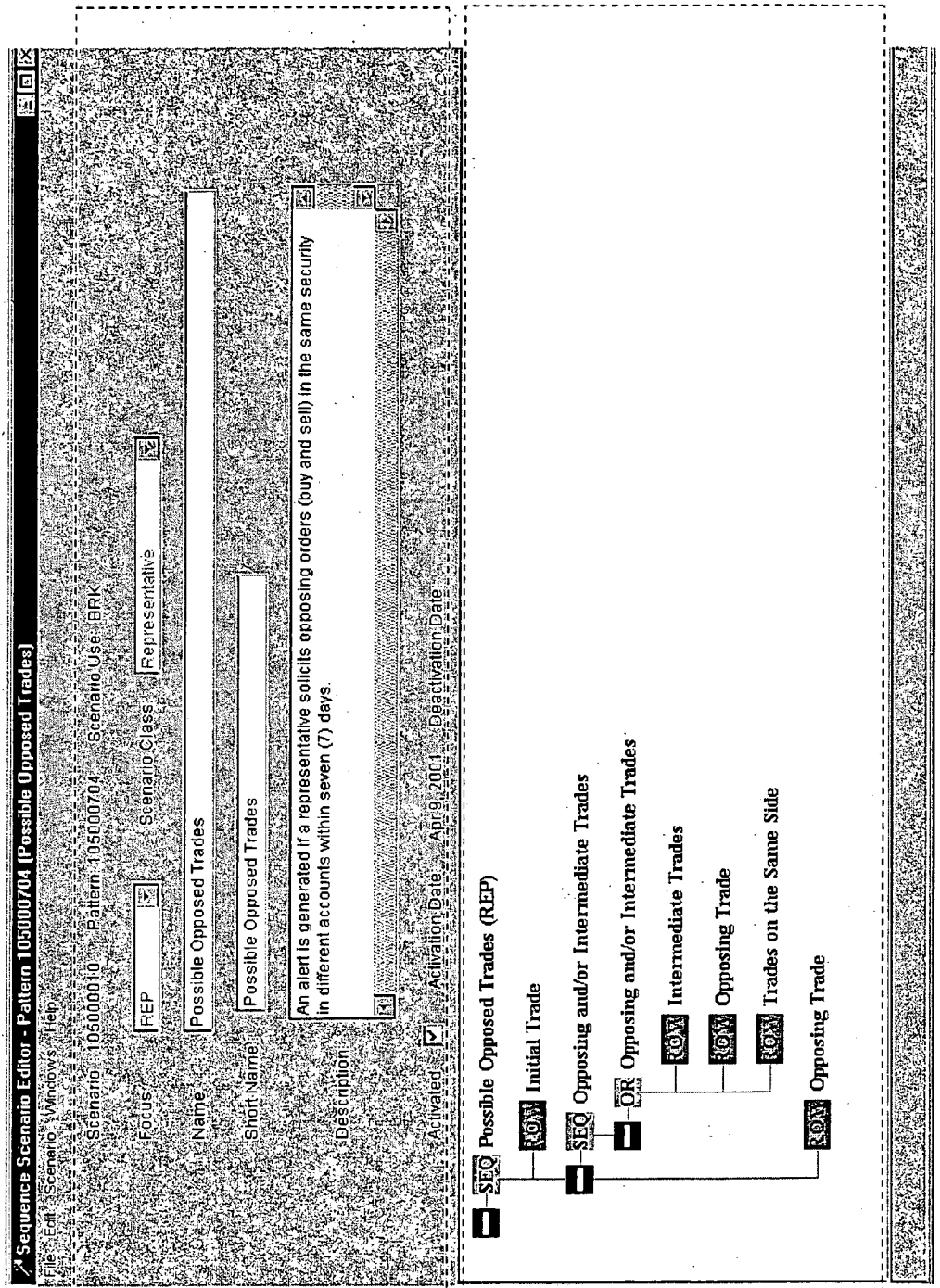
FIG. 13 illustrates a graphical user interface for a sequence scenario editor.

If result of the scenario activity test 524 is to modify an existing scenario 528, then the system must retrieve the scenario 532 and implement changes 540 prior to updating the library 544. Again, once the library is updated 544, then the system selects the scenario library process 548. In one embodiment, the create scenario 292, implement changes 540, and parameterization 564 processes are performed during an off-line sequence and not as part of the advanced scenario-based alert generation and processing system 200. FIG. 13 represents one example of a scenario from the scenario library 548 displayed by a graphical user interface. FIG. 13 describes the selected scenario and provides a high-level description of the process flow that the advanced scenario-based alert generation and processing system 200 may execute. At that point, another decision must be made as to whether or not to change thresholds 552. If thresholds are not changed 556, then the system proceeds to apply scenario library 572. If thresholds are changed 560, then the system may allow the user to enter parameterization 564 and values may be entered/saved 568 prior to applying the scenario library 572.

Figure 14:
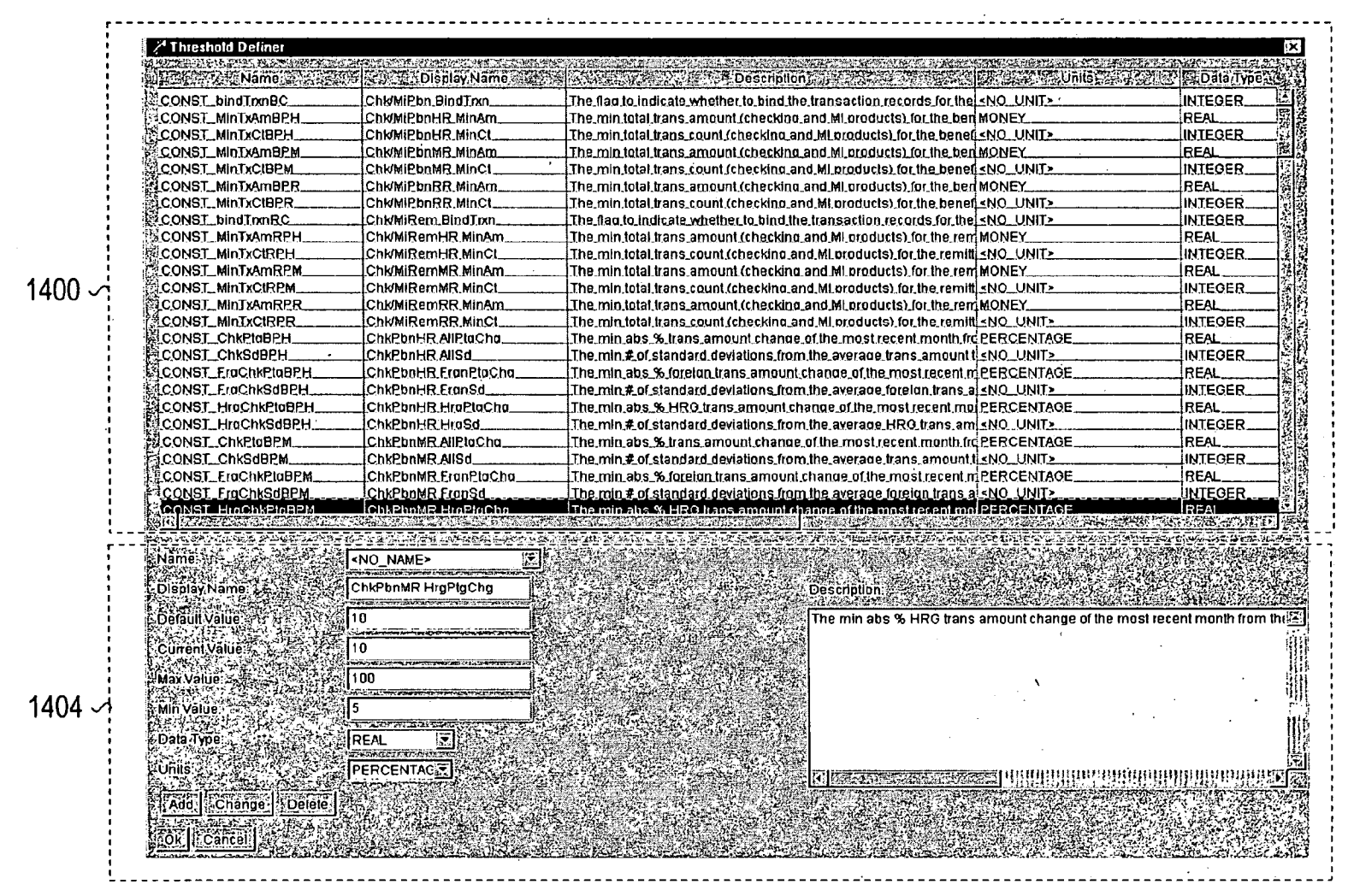

FIG. 14 represents an example of parameter values for a particular scenario. In the parameterization 564 step, the logic or values of a scenario may be modified providing added flexibility and capability in detecting events, entities, and behaviors of interest. The system may then select and apply detection algorithms 576, output and save matches 580, process matches 582, alert generation 244, route alerts 586, enter workflow process 590, save alert history 594, and then end 598 the sequence. The process matches 582 step may be included in the processing 412 sequence. The route alerts 586 and enter workflow process 590 steps may be included in the case management 416 sequence. The save alert history 594 step may be included in the archive 424 sequence.

A basic scenario is a simplified approach to defining events and entities that are known to be indicative of a behavior of interest. Basic scenarios typically have a single type of event or entity, or a small number of events and entities that operate on a set of data to determine if the scenario of interest is present. An example of a basic scenario is an exception report. An exception report flags individual transactions and simply produces a list of transactions abstracted from the context in which they occurred. Evaluation of the exceptions based solely on the information provided in the exception report is difficult and in some cases impossible.

Basic behavior detection is a method of detection that hinges on the observance of a single event or a simple aggregate of events. As an example, basic behavior detection of money laundering could be performed by defining a basic money laundering scenario of "all cash transactions over $10,000" and generating an exception report indicating all of those transactions. One difficulty with implementing this approach is that the exception report would merely indicate all events fitting that particular basic scenario definition and would inherently have a high false alarm rate. In the example given, many, if not all of the transactions identified would be legitimate and not indicative fraudulent behavior.

Figure 10:
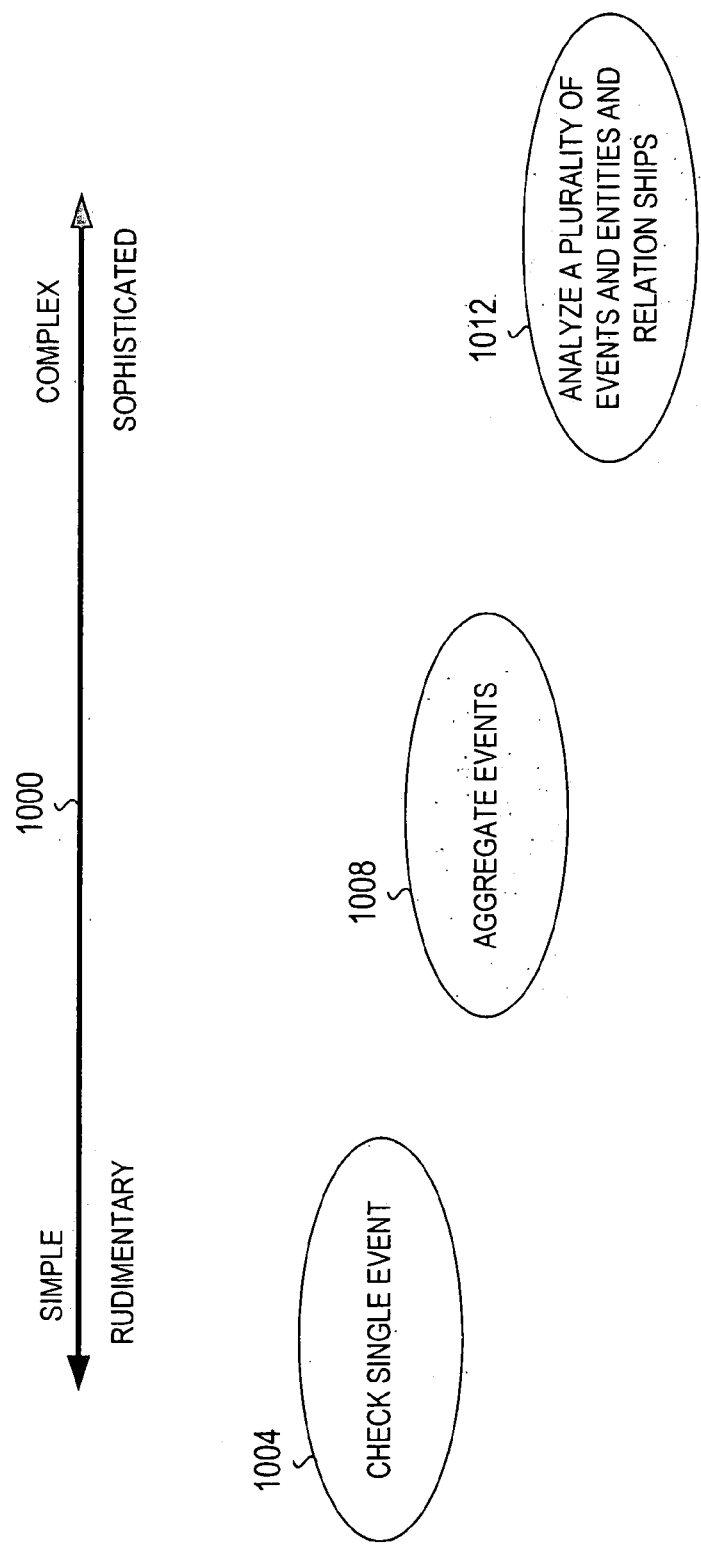
FIG. 10 illustrates a range of complexity in behavior detection problems.

FIG. 10 represents a scale of complexity for behavior detection. Scale 1000 represents the spectrum of simple detection using rudimentary approaches to complex detection using advanced scenarios. Checking a single event 1004 represents solutions based on the evaluation of a single data event or transactions in assessing behavior. Examples include, but are not limited to, currency transactions above a certain size, phone calls made by a consumer above/below certain thresholds, or web site visits to a particular site. Filtering or other approaches can identify behaviors, activities, or events of interest based on a single criteria, but the reliability with which the behavior is detected will typically be low. Aggregate events 1008 represents approaches incorporating the use of multiple event tests for determining behavior, activities, or events of interest. An example could be to identify customers whose total purchases equal a certain threshold during a period of time. This would then aggregate all customer purchases by a customer to identify those customers whose behaviors are of interest.

Other basic scenarios for fraud might include premature IRA distribution, identifying entities or account holders that are high-risk or are in high-risk geographies, and other such scenarios or attributes that are known to be indicators of the specified behavior. Although these basic scenarios may be useful in identifying the behavior of interest, those committing the behavior are often aware of the basic scenarios, and they may modify their behaviors, actions, and activities to avoid detection.

An advanced scenario creates a rich package of information that allows the behavior of interest to be observed or investigated in context. An advanced scenario may contain the elements of focus, highlights, and specific events and entities. In the embodiments, an advanced scenario may also include parameterized logic.

A focus is a centralized event or entity upon which the behavior can be further investigated. As an example, a customer that is suspected of laundering money can form a focus. Another example would be a central account that is linked to a number of other accounts. Although all of the accounts would be subject to investigation and tied to the alert, the focus is the central account. An illustration of the presentation of focus is shown in the focus column 1641 of alert list 1604 as shown in FIG. 16.

Highlights are summarizations of the events and entities involved in an alert representing a behavior. An example would be the total dollar amount passed through an account or the total number of transactions in that account. A highlight summarizes and specifically points out why a set of events, a set of entities, or a set of events and entities is of interest, but does not list those specific events and/or entities. An illustration of the presentation of highlights is shown in the highlights column 1646 of alert list 1604 as shown in FIG. 16.

An advanced scenario links the alert to the specific events and entities that have resulted in the generation of that alert. An example would be a set of accounts that are allegedly part of a money laundering ring (entities) and the deposits into and withdrawals from those accounts (events). An illustration of the specific events and entities that can result in the generation of an alert are shown in alert details 1704 of FIG. 17.

An advanced scenario contains logic that determines whether or not a match and alert may be generated. This logic contains parameters, accessible to the user 128 or administrator 136 through a user interface that may be varied to set a threshold or vary a rule to generate a match and alert. An example of parameterized logic is "a money laundering ring must include x different accounts and y different transactions." In this example, x and y could be set to 3 and 40 respectively, and those values would be altered, by a machine or a user, based on the number of false positives generated. An illustration of parameterized logic is shown in the threshold parameters section 1404 of FIG. 14.

Advanced behavior detection requires the analysis of a plurality of events and entities, and the relationships between events, between entities, or between events and entities. As an example: a drug dealer wants to get large amounts of cash into the banking system, but knows that if he/she deposits cash, the bank will file a government form on him/her. To avoid detection the dealer decides to buy money orders with the cash because money orders are regulated less rigorously. The dealer also knows that if he/she buys $3,000 or more in money orders at one time, the dealer has to supply a personal identification. To avoid this the dealer travels around to several convenience stores, and at each the dealer buys five $500 money orders. The dealer then deposits all the money orders at the bank, but to avoid suspicion, the dealer makes the deposits at several branches over several days into several accounts. The dealer later consolidates the money into one account and wires it to an account in the Cayman Islands. The dealer used several bank accounts that on the surface looked independent (e.g., by using different names, addresses, etc.), but they were in fact being controlled by one person in order to launder money. The serial numbers on his money orders also were in sequential groups of five. Even if these were deposited into separate accounts, the repeating sequences of five $500 money orders could point to someone trying to stay below the $3,000 ID threshold if the relationship among the deposits is detected. One embodiment of the invention uses link analysis and sequence matching algorithms designed to find hidden relationships among events and entities. Link analysis takes pairs of linked entities and pieces this information into larger webs of interrelated entities. Sequence matching is employed when the sequence of events (such as the time sequence) contains some important clue into hidden relationships. Many of the most insidious scenarios can only be solved with this type of complex analysis because the behavior is spread over many events over multiple entities over a range of time.

The use of advanced behavior detection 1012 is illustrated in FIG. 10 wherein a plurality of events and entities are monitored, and wherein the relationships between those events and entities can be tabulated, analyzed, and monitored using algorithms as described herein. Alerts may be generated based on the events and entities monitored, and the alert reporting may include references to these specific events and entities such that the details of those events and entities may be readily accessed.

One way of viewing advanced behavior detection is an n-dimensional approach in which several types of events and entities are simultaneously, considered across at least products and lines of business in order to identify the behavior of interest. The advanced behavior detection may be based not only on the events and entities that are known to be indicative of a behavior of interest, but also on the relationships, whether temporal or spatial (e.g. physical or electronic location) between those elements.

Figure 3:
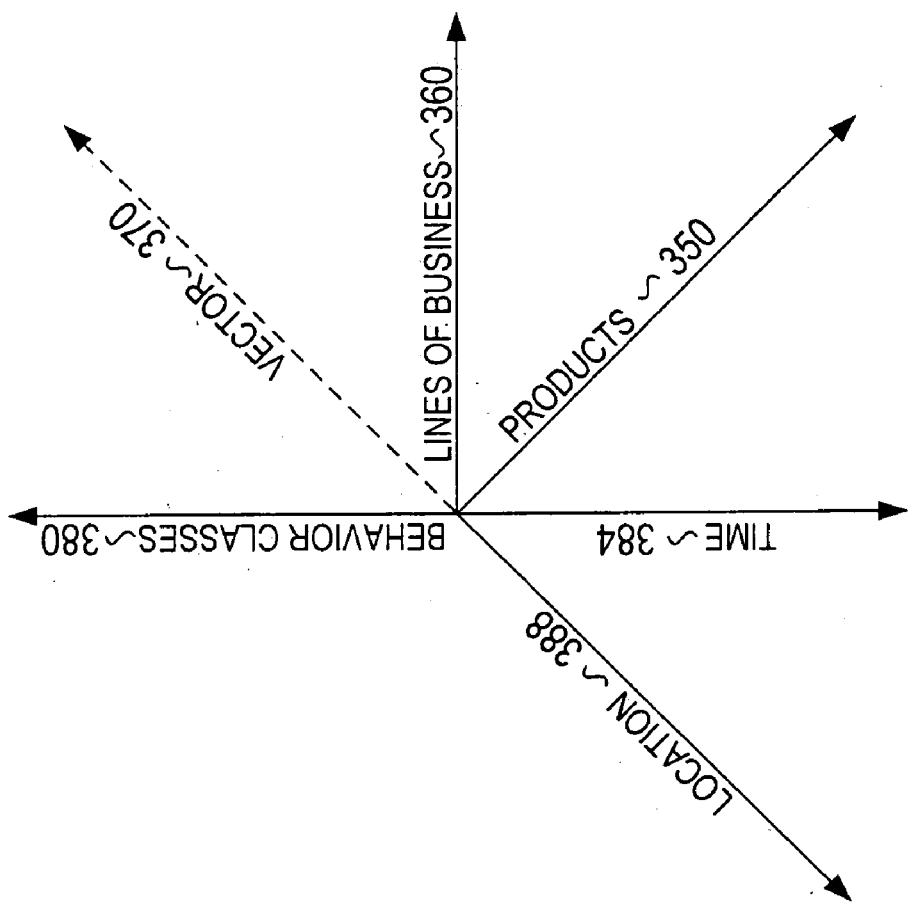
FIG. 3 illustrates an n-dimensional space describing the problem of behavior detection.

FIG. 3 illustrates an n-dimensional representation of the problem of behavior detection. Time axis 384 represents the time at which an event occurs. Location axis 388 represents the virtual or physical location of an entity or an event. Products axis 350 may relate to a variety of goods or services with examples including, but not limited to, financial services, telecommunications, healthcare, and consumer goods. As an illustration, products axis 350 for the financial services industry may include equity, bonds, commodities, and/or options; for the telecommunications industry it may include data, wireless services, land-line and/or pager services; for the healthcare industry it may include MRI, X-ray, office visits and/or blood work; and for the consumer goods industry it may include food, cosmetics, over-the-counter medicines and/or jewelry. Lines of business axis 360 can be defined as the type of business involved. Examples include, but are not limited to, retail, wholesale, private and institutional types of business. Behavior classes axis 380 represents a range of behaviors that is of interest. In the case of financial services these behaviors may include fraudulent behavior, money laundering, or other licit or illicit activities. In the case of health care or insurance, the behavior of interest may also include fraudulent behavior. Although fraudulent behavior is frequently the behavior of interest, positive behaviors may also be specified. The vector 370 of FIG. 3 represents one or more additional vector(s) that may be created or used to provide an additional dimension for identifying targeted behaviors of interest. As an example, vector 370 could be, as applied to health care, the provider type, with the provider type being doctor, medical device, pharmaceuticals, and non-doctor service.

Referring to FIG. 3, events and entities lie somewhere within the n-dimensional space described by the basis vectors. A basic behavior can be understood to be a single point, or clustered set of points in the n-dimensional space. Basic behavior detection is the process of locating the points of interest. Advanced behavior can be understood to be a complex set of points in the n-dimensional space, not necessarily in close proximity. Advanced behavior detection is the process of identifying those points by examining the relationships among those points and mapping those relationships to the advanced scenario.

FIG. 9A illustrates a data transformation process that can be applied to the advanced scenario based alert generation and processing system 200. System A 900, system B 904 and system C 908 represent external data sources or information systems containing raw or pre-transformed data. For illustration purposes, FIG. 9A represents these three systems, although the data transformation process may access data from any number of data sources or information systems. Transfer 936 represents an exchange interface that transfers raw data 208 from the data source(s) or information systems to a consolidation/standardization process 912 where the data is converted to a consistent format. Transfer 916 represents the transfer of the transformed data 212 to a data mart 920 where the transformed data 212 is stored. Data mart 920 may include a storage device and a database application in which the transformed data 212 may be stored, retrieved, and analyzed. Process 928 represents manipulation of the transformed data 212. Flat file 924 represents a pre-processed set of data that already conforms to the data format required by the system and does not need to go through the transfer step 936. Flat file 924 may be stored in the data mart 920 through interface 932. This description represents one possible embodiment of the invention for transferring raw data into a defined data model wherein transformed data 212 may be accessed.

Figure 9B:
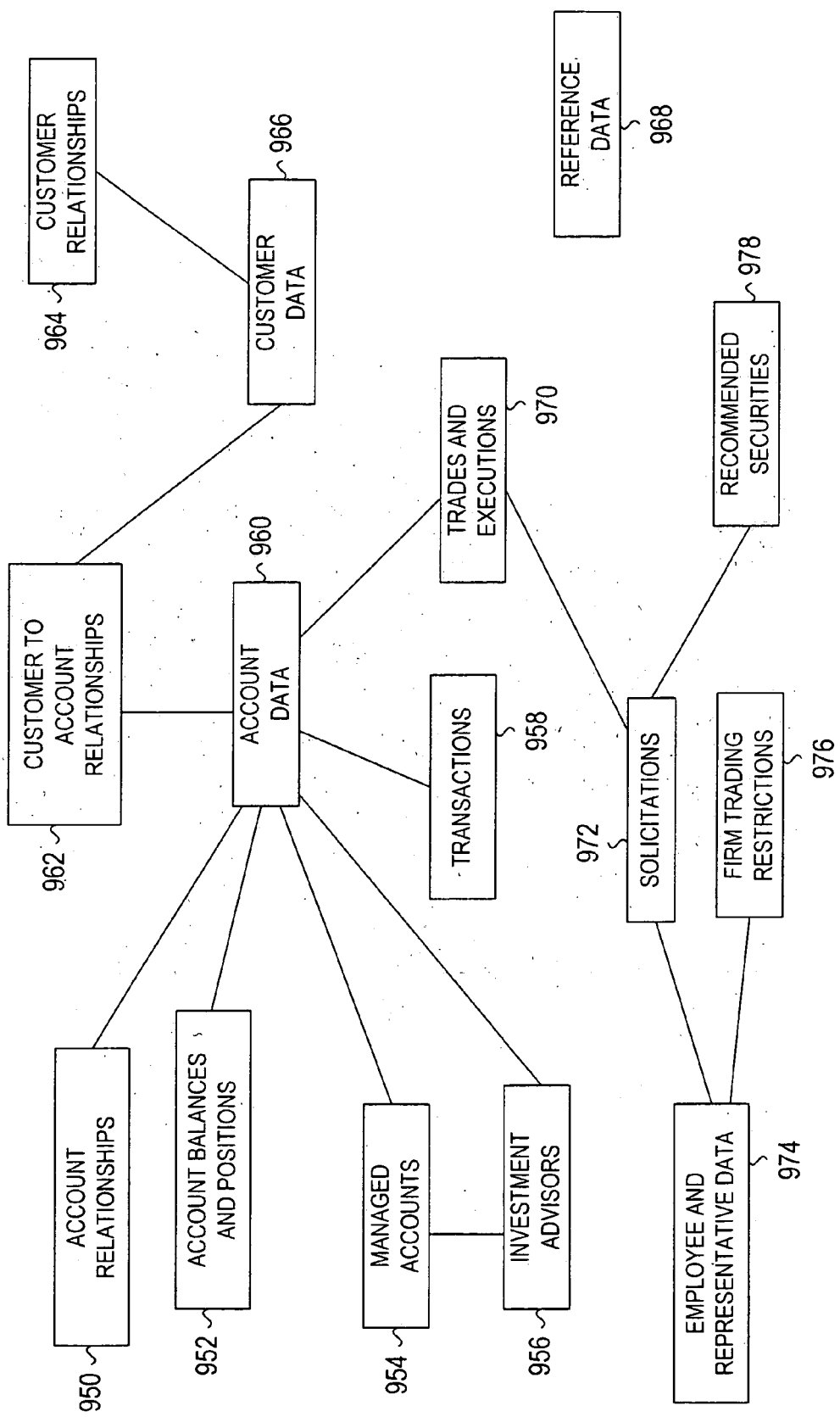
FIG. 9B illustrates representative tables involved in a data transformation process.

FIG. 9B is representative of tables involved in the data transformation 400 process. The table configuration and extracted data may vary depending upon the specific scenario or analysis being performed. FIG. 9B is representative of information that is extracted and transformed for a particular situation or purpose. Other types of tables, extracted data, and associations may be used as part of the data transformation 400 process. In one embodiment, account relationships table 950 may contain information such as account restrictions, relationships between accounts, and servicing organization(s) for the account. Account balance and position table 952 may contain information such as current balance, current positions, group, investment objectives, option pairing, and features. Managed accounts table 954 may contain information such as accounts managed by advisor, knowledge and approval. Investment accounts table 956 may contain information such as advisor, objectives, level of authority, and accounts managed. Transactions table 958 may contain information such as open trade executions and electronic transfer of funds. Account data 960 may contain information such as the account holder's name, address, social security, phone number, email address, and group. Customer to account relationship table 962 contains information such as relationships between customers and accounts, roles that customers can assume, and anticipated transaction profile. Customer relationship table 964 contains information such as relationships between customers, trading restrictions, product knowledge, and experience. Customer data table 966 may contain information such as customer name, gender, age, employer, and income level. Reference data table 968 may information such as news, exchanges, indexes, code translator, history of changes, customers with controlling interest, lists of customers, security, users, logon, list, and type. Trade and execution table 970 may contain information on completed transactions and electronic transfers. Solicitations table 972 may contain information on securities approved for solicitation and buy/sell orders for securities approved for solicitation. Employee and representative data table 974 may contain information on employee, representative, and non-representative names, addresses, emails, groups, phone numbers, trading restrictions, organizations, relationships, locations, and non-trade activities. Firm trade restrictions table 976 may contain information on employees with trading restrictions, securities watchlist, and watchlist sources. Recommended securities table 978 may contain a list of securities that a firm is recommending, inventory lists, pending transactions in recommended securities, transaction histories of recommended securities, and records of agents or brokers involved in the transaction of recommended securities. These tables or databases can be developed in a variety of computer-based languages or applications including, but not limited to, Java, C, C++, Access, dBase and products offered by Oracle and Sybase. Also, the field names may be customized to meet individual preferences, and the structure of the tables may be constructed to account for different possible implementations. The tables represented in FIG. 9B are extracted from data contained in transformed data 212.

Link analysis provides the ability to transform customer-to-customer business activities from a data representation where they appear as individual activities between customers, to a third-party network representation where they become group activities confined in each third-party network. One advantage of link analysis is that group behaviors become more evident, and therefore they are more effectively and efficiently analyzed in a third-party network representation since each group of customers connected through customer-to-customer activities becomes a single object in the network representation. The new network representation forms a third-party network platform.

FIG. 6 illustrates a link analysis algorithm. Item 672 is a descriptive element for a variety of possible categories including, but not limited to, account, entity, transaction or individual. Common link 676 is also a descriptive element for a variety of possible categories including, but not limited to, account, entity, transaction or individual. Example 680 is another descriptive element providing a specific description of linkages based on the information provided in the diagram.

Item numbers #1 604, #2 608, #3 612, #4 616, #5 620, and #6 624 represent similar categories for which behavior detection techniques and analysis are to be performed. Common link 676 categories A 660, B 664 and C 668 represent similar categories for which behavior detection techniques and analysis are to be performed. Line 628 illustrates a link between #1 604 and A 660. Line 632 illustrates a link between #2 608 and A 660. Line 640 illustrates a link between #3 612 and B 664. Line 636 illustrates a link between #4 616 and A 660. Line 644 illustrates a link between #4 616 and B 664. Line 648 illustrates a link between #5 620 and B 664. Line 652 illustrates a link between B 664 and C 668. Line 656 illustrates a link between #6 624 and C 668. Descriptive field 684 describes the link between #1 604 and all other descriptive items 672 through the various common link 676 connections.

A network detection algorithm, such as link analysis, may be utilized to identify common elements between a plurality of events, entities and activities. As the associations extend beyond the original sources, the link analysis may identify common elements through direct or indirect association among the various events, entities, and activities. Elements of interest may be retrieved, collected, or processed from a general data source and may be stored in a separate database or dataset. As additional elements are evaluated, the matches and the link between matching elements may also be stored. This process may continue for the various elements and data sources.

Link analysis can be understood from the following example: if two accounts (A&B) were registered in different names but had a common address, then the network detection algorithm would link the two accounts because of the matched address as a result of the direct connection. If another account were introduced (Z) which shared the same phone number as account A, then accounts A and Z would be linked through that direct association. In addition, accounts B and Z would be linked through their indirect association via account A. The network detection algorithm may be applied on a variety of elements, fields, datasets, and databases in identifying connected, directly or indirectly, events, activities, and entities. By creating and storing matches between elements, network detection algorithms may be able to extract data from a general data source in identifying events, entities, and activities that have either direct or indirect associations.

A specific link analysis algorithm is presented in the co-pending, commonly-owned patent application entitled "Analysis of Third Party Networks," the inventors of which are Tao Zhang and Steven Kirk Donoho, which was filed as a utility patent application on Jan. 13, 2003, having a Ser. No. 10/341,073, and which is incorporated herein by reference in its entirety, but is not admitted to be prior art. In addition, representative code corresponding to a link analysis method is provided below in the section entitled "Representative Code."

FIG. 7 illustrates the functionality of the sequence matching detection algorithm. FIG. 7 provides three examples; example #1 700, example #2 704, and example #3 708. Under example #1 700, there is a descriptive element 712, along with data sequence 716, followed by sequence matches 720, 724, and 728 that meet the test criteria established in descriptive element 712. Under example #2 704, there is a descriptive element 732, along with data sequence 736, followed by sequence matches 740, 744, and 748 that meet the test criteria established in descriptive element 732. Under example #3 708, there is a descriptive element 752, along with data sequence 756, followed by sequence matches 760, 764, 768, 772, and 776 that meet the test criteria established in descriptive element 752. This detection algorithm is particularly useful when evaluating events, activities, or behaviors in a certain sequence.

Sequence detection algorithms analyze data for specific time-based patterns. As the data is analyzed, potentially significant and meaningful data may be temporarily stored in a separate database until further analysis of the remaining data stream(s) can be completed. Since a sequence detection algorithm analyzes data for specific time or occurrence sequencing of events, activities, and behaviors, the detection algorithm may analyze the entire dataset and save potential matches until its rule-based approach can determine whether the temporarily stored data meets the sequence detection requirements. If a particular sequence of events, activities, or other behaviors have met established constraints, then a match may be confirmed and the complete dataset capturing the events, behaviors, and activities of interest may be saved at which point an alert may be generated. If the analyzed data does not meet the established constraints, then the temporarily stored data may be discarded with no alert being generated. In addition, sequence detection algorithms may be used not only to identify events, activities, or behaviors that have occurred, but also to identify ones that have not occurred.

Representative code corresponding to a sequence detection method is provided below in the section entitled "Representative Code."

FIG. 8 illustrates examples of outlier detection algorithms. Example #1 800 and example #2 804 provide two such specific examples of this algorithm, which is not an exhaustive list of potential examples. Under example #1 800, Y axis 808 and X axis 812 define the parameters for the data. Cluster 816 represents various data points based on the Y axis 808 and X axis 812. Datapoints 820 and 824 represent outliers which are significantly beyond the cluster 816. In example #1 800, an approach to detect outliers may be to use statistical analysis and regression modeling to identify points which are statistically significant (i.e., beyond several standard deviations away from the mean). Example #2 804 includes Y axis 828, X axis 832, clusters 836, 840 and 844 with datapoints 848 and 852. In example #2 804, traditional statistical analysis and regression analysis may not be effective. The clustering effect would create a higher standard deviation and make it more difficult to detect outliers. Another approach, especially when used when multiple clusters are present, is to compare distances between data points within a cluster first and then compare that information with other points outside the clusters to determine whether or not they are outliers. In example #2 804, cluster 844 is relatively close to datapoint 848. As such, in example #2 804, the only outlier identifiable is datapoint 852 which is significantly separate from plotted clusters. In either example, outliers represent behaviors, activities, or other events well beyond the average, mean, or other benchmark calculation.

Representative code corresponding to an outlier detection method is provided below in the section entitled "Representative Code."

Algorithms for link analysis, sequence matcher, outlier detection, rule pattern, text mining, decision tree, and neural networks are commercially available from a variety of vendors, including, but not limited to SAS Institute and their Enterprise Mining application, SPSS Inc. and their Predictive Analytics™ application, International Business Machines (IBM) and their DB2 Intelligent Miner™ application, Visual Analytics and their VisuaLinks™ application, and NetMap Analytics with their NetMap™ Link Analysis application with these various applications containing software and algorithm technologies.

As matches are identified through the detection algorithm analysis, the matches may be prioritized based on a rules-based methodology. Identified events, entities, or transactions of interest may be evaluated based on user defined logic to determine the relative prioritization of the match. The prioritization value may be saved with the match. In addition, the invention may group events, activities, and transactions prior to transferring the alert into the routing and workflow process. The prioritization and grouping operations may be performed based on pre-defined criteria including parameters related to amounts, number of events, types of events, geographic location of entities and events, parties involved in the events, product lines, lines of business, and other parameters relevant to the type of behavior of interest. These parameters may be modified by the user 128, administrator 136, domain expert 108, or developer 104. During this step, summary information of the alert and associated dynamic link to the alert details may be saved along with prioritization and grouping information. The alert details may vary based on the event and entity of interest, but examples of such details include the account holder's name, address and phone number, account balance, amount of a transaction or series of transactions, recipient of a transfer or deposit.

Representative code corresponding to prioritization and grouping methods are provided below in the section entitled "Representative Code."

Once an alert has been prioritized and grouped, the invention allows for a computer-based approach in routing the alert and managing the workflow process for greater efficiency and effectiveness. Based on the prioritization and grouping of the alert, the invention routes the alert based on pre-determined instructions. As the alert is reviewed, investigated, and processed, the invention provides highlight information and dynamic links to detailed information thereby expediting and facilitating this step. In addition, the invention stores the historical data and investigation data for later review and retrieval if necessary. The invention allows the alert to be visually presented in a variety of formats, which may be selected by the user 128, administrator 136, domain expert 108, or developer 104 and modified based on filtering elements.

Figure 12:
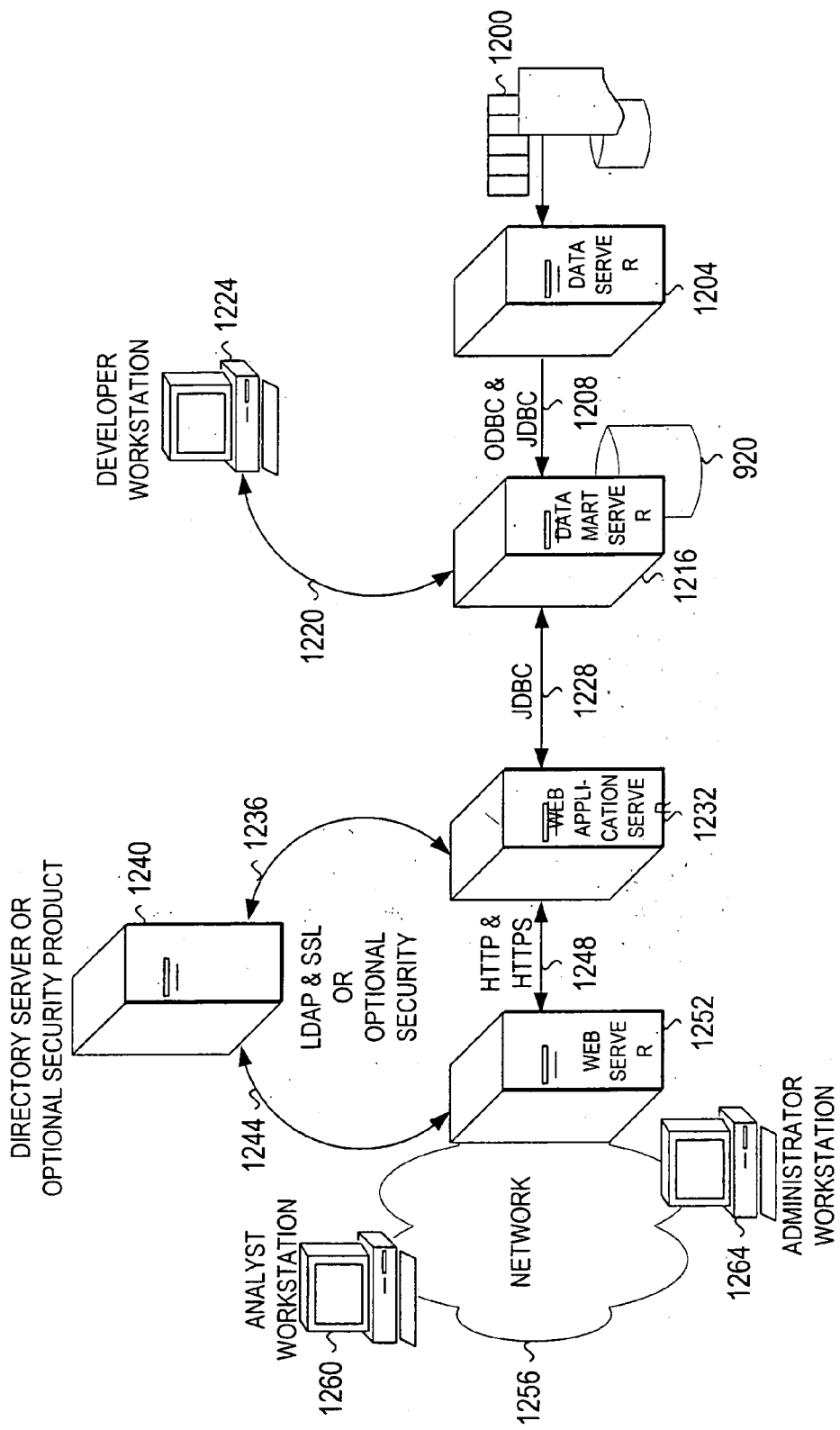
FIG. 12 represents a networked infrastructure suitable for implementation of the system.

FIG. 12 illustrates a network configuration on which the invention may be, practiced. Business data 1200 may be the equivalent of the raw data 208 (pre-transformed) and may come from a variety of data sources and information systems, including, but not limited to files, queues and databases that are contained on a data server 1204. The business data 1200 may be transferred 1208 to a data server 1216 and data mart 920. A developer interface 1220 is provided to a developer workstation 1224 enabling interaction with the data mart server 1216. Information from the data mart server 1216 may be transferred 1228 to a web application server 1232 at which point an interface 1236 to a directory server/optional security product 1240 may be available. Data between the web application server 1232 and web server 1252 may be transferred through a link 1248. The web server 1252 may have an interface 1244 to the directory server/optional security product 1240 and may connect to a network 1256. Analyst workstation 1260 and administrator workstation 1264 may be connected to network 1256.

Workstations, network connections and databases for the implementation of the system are commercially available and integration of these platforms is known to those skilled in the art. As an example of units that can be used to assemble the system, the servers described in FIG. 12 can be based on operating systems such as Solaris™, AIX™, Linux™, Unix™, Windows NT™ or comparable platforms. Workstation and server equipment may be sourced from a variety of vendors, including, but not limited to Dell, Hewlett-Packard, IBM and Sun. The network 1256 can consist of an intranet, Internet, LAN, WAN or other infrastructure configurations that connect more than one workstation or server. The data mart 920 represents database structure including, but not limited to relational or hierarchal databases which products are commercially available through vendors such as Oracle, IBM, and Sybase among others, whose products sell under the trade names Oracle 8, DB2, and Adaptive Server respectively. Protocols in transferring data, commands, or alerts between the workstations, servers, data sources, and network devices are based on industry standards and can be written in a variety of programming languages. FIG. 12 represents one particular system configuration encompassing multiple servers. Different configurations are also possible in deploying the advanced scenario-based alert generation and processing system 200. For example, it is possible to consolidate functions thereby reducing the number of servers needed.

Figure 11:
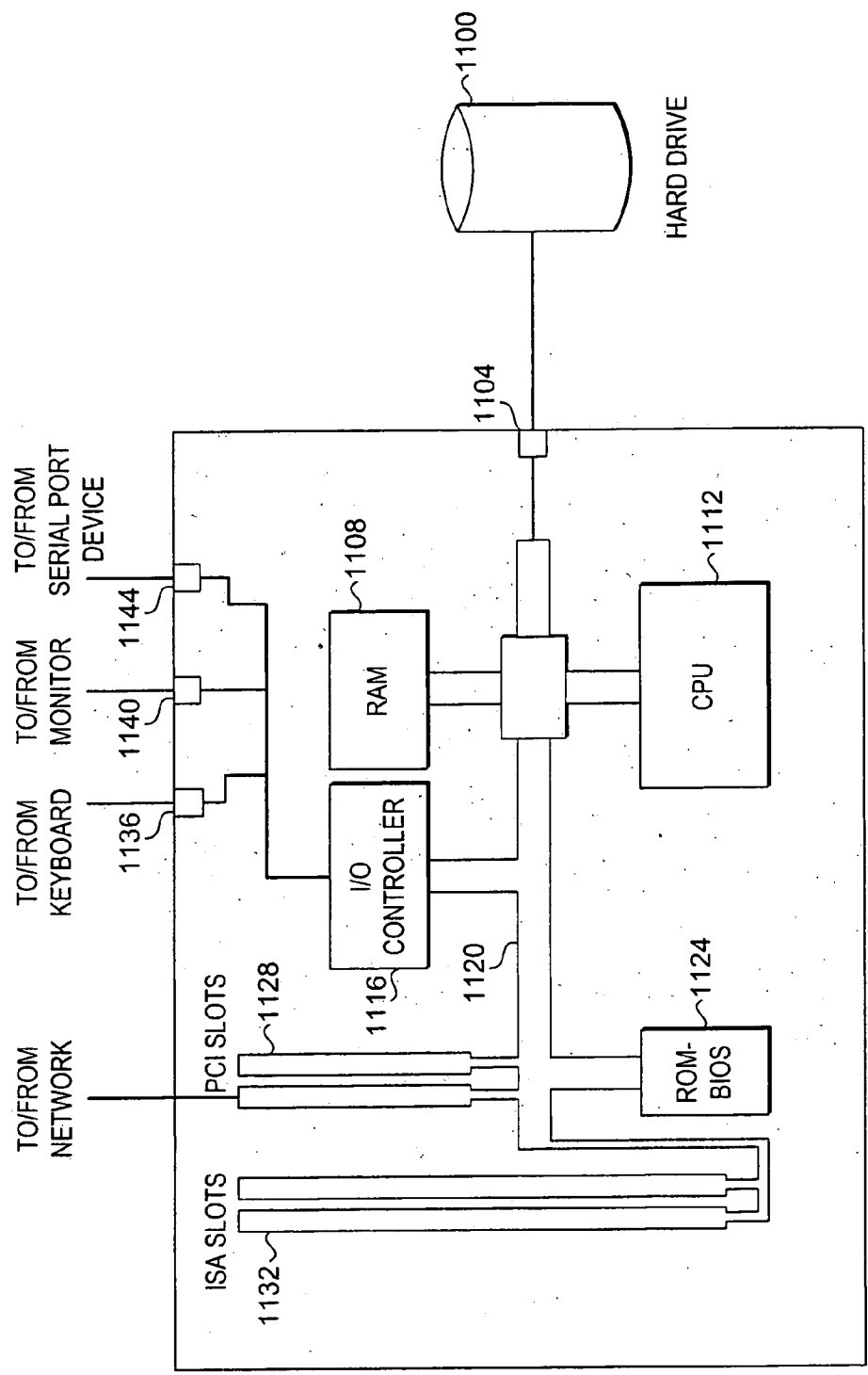
FIG. 11 represents a computer on which the system can be implemented.

FIG. 11 shows the block diagram of an exemplary computer system for a realization of the subscriber monitoring system based on the reception of multimedia signals from a bi-directional network. A system bus 1120 transports data among the CPU 1112, the RAM 1108, Read Only Memory-Basic Input Output System (ROM-BIOS) 1124 and other components. The CPU 1112 accesses a hard drive 1100 through a disk controller 1104. The standard input/output devices are connected to the system bus 1120 through the I/O controller 1116. A keyboard is attached to the I/O controller 1116 through a keyboard port 1136 and the monitor is connected through a monitor port 1140. The serial port device uses a serial port 1144 to communicate with the I/O controller 1116. Industry Standard Architecture (ISA) expansion slots 1132 and Peripheral Component Interconnect (PCI) expansion slots 1128 allow additional cards to be placed into the computer. In an embodiment, a network card is available to interface a local area, wide area, or other network.

The present invention may be realized in a number of programming languages including C, C++, Perl, HTML, Pascal, and Java, although the scope of the invention is not limited by the choice of a particular programming language or tool. Object oriented languages have several advantages in terms of construction of the software used to realize the present invention, although the present invention may be realized in procedural or other types of programming languages known to those skilled in the art.

FIG. 13 represents a user interface for a sequence scenario editor. Scenario editor descriptive elements 1300 may contain information used to describe a particular scenario that is being considered. Certain sub-fields may be fixed and provided by the system, such as "Pattern" and "Scenario Use," whereas the remaining fields may be modified to provide additional information on the particular scenario. Scenario representation 1304 may describe the associated scenario by providing information on the process, steps, loops, or other elements be involved in a particular application. In the example shown in FIG. 13, scenario representation 1304 may illustrate the advanced scenario of possible opposed trades in which a broker (the focus) may be soliciting both buy and sell orders on the same security, an unethical and therefore unacceptable (to the NASD) behavior. Scenario representation 1304 shows that an initial trade for a security is registered. Once that initial trade has been completed, opposing and/ intermediate trades may be reviewed to identify if those trades have been on the same security.

FIG. 14 represents a user interface for a threshold definer. Parameter elements 1400 may provide a list of variables within the appropriate scenario. Furthermore, parameter elements 1400 may provide additional information, including, but not limited to "Name", "Display Name", "Description", "Units", and "Data Type" to more fully describe the variable, its attributes, and its use. Threshold parameters 1404 may provide a user 128, developer 104, domain expert 108, or administrator 136 with the ability to modify or change threshold or parameter values associated with underlying variables. As an example, the thresholds and parameters that can be modified in threshold parameters include name, display name, default value, current value, max value, min value, data type, and units. Sub-field elements may also contain drop down menus to simplify use. By highlighting a row within parameter elements 1400, the associated information may then be retrieved and displayed in the threshold parameters 1404 section.

Figure 15:
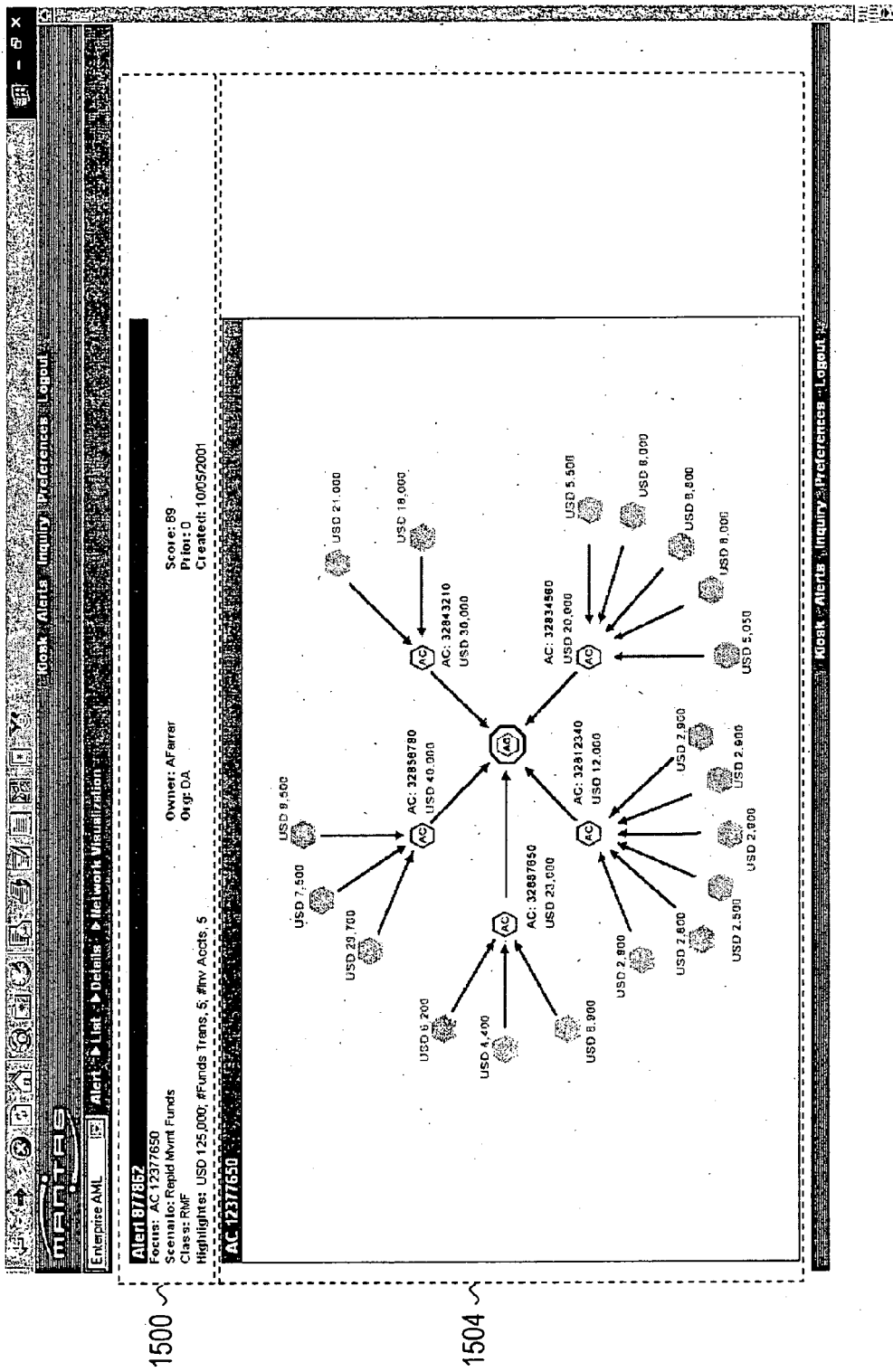
FIG. 15 illustrates a graphical user interface and display for network visualization of alerts.

FIG. 15 represents a user interface for a network alert visualization. Alert summary information 1500 may provide summary information related to the alert including focus, scenario, class, highlights, owner, organization, prioritization, and the date the alert was created. Alert visualization 1504 is a graphically generated representation of the behavior, activity, or event of interest. In FIG. 15, an example of networks of related accounts is provided. In the alert summary information 1500 section, a unique alert ID has been generated in order to track this event. Additional information has also been provided identifying the amount of money, in question, along with the number of accounts and activities involved. As part of the case management process 416, an owner and organization have been assigned to this alert. The alert visualization 1504 section then provides a visualization of the transfers and amounts in question.

FIG. 16 represents a user interface for an alert list. The filtering elements 1600 contains a plurality of sub-fields that may be used to modify the presentation of alerts. For example, the sub-fields may include organization or owner, scenario class or scenario, prioritization, focus, age, and status. Organization refers to a list of internally defined groups involved in the detection process. Owner refers to individuals or groups that have been assigned various alerts. A user 128, administrator 136, domain expert 108, or developer 104 may select the filtering elements 1600 sub-fields in affecting what information is displayed and in what order.

Referring to the user interface shown in FIG. 16, multiple alerts are shown in alert list 1604. Alert list 1604 may contain a prioritization column 1640, where the prioritization SC represents a numeric value derived from the application of the scenarios and the parameterized values within the scenarios. A focus column 1641 may be present to indicate the centralized event or entity of interest. A class column 1642 labeled CL may indicate the general class of behavior (e.g. money laundering). The scenario column 1644 may list the scenario name. The highlights column 1646 may provide the summary information of the individual events and entities. Prior column 1648 may indicate the history of alerts on that focus (e.g. the number of prior alerts). Owner column 1650 may indicate the user 128 who has been assigned the alert. Organization column 1652 may indicate the organization in which the user 128 resides. Age 1652 may indicate and age such as the number of days since the alert was created. Status column 1656 may indicate the status of the alert, examples of which can be open, closed, pending, and transferred. Details column 1658 provides links, preferably in the form of hyperlinks to alert details, such as those illustrated in FIG. 17.

In the user input section 1600, the user 128, administrator 136, domain expert 108, or developer 104 may select how the data is to be presented by sorting the output based on, for example, the prioritization, focus, class, scenario, prior alerts (prior), owner, organization (org), age, or status followed by the number of views retrieved at one time (e.g., 10, 20, 50, or 200 alerts). In one embodiment, these selections are made through the use of pull down entry fields and numerical entry fields. Within the filtering elements section 1620, the user 128, administrator 136, domain expert 108, or developer 104 can filter based on organization, owner, scenario class, scenario, prioritization, focus, age and status. Within the sort-by section 1624 the user 128, administrator 136, domain expert 108, or developer 104 can have the information displayed by ranking or grouping based on prioritization, focus, class, scenario, prior alerts (prior), owner, organization, age and status.

FIG. 17 represents a user interface for alert detail. Alert status 1700 section contains summary and status information relevant to the alert in question including, without limitation, focus, scenario, class, highlights, owner, organization, prioritization, priority, and date the alert was created. Focus refers to an event or entity of interest. Scenario refers to a specific type of detected behavior or activity of interest. Class may be a general description of the type of scenario. Highlights may provide summary information on the alert. Owner may refer to an individual or group assigned to investigate the alert. Organization may refer to a department overseeing this activity. Prioritization may refer to a numeric value associated with the alert derived from the advanced behavior detection and alert generation system. Priority is a value associated with the importance and urgency of the alert, which may be based on several factors. Created may refer to the date the alert was generated. Alert details 1704 section may provide specific detailed behavior, event, and activity-based information on the alert in question. Information on the customer bank, name, type, business unit, watchlist, and location may be provided automatically by the system. The information contained in the remaining section may be dependent upon the type of alert generated and may vary accordingly. The visual presentation of the detailed information may expedite the users' ability to quickly and more accurately identify behaviors, activities, or events of interest that require further review or investigation or that enable the user to determine that the behaviors, events, or activities in question are legitimate.

FIG. 18 represents a user interface for alert history. Alert transaction 1800 section may provide information on current alerts. Alert history 1804 may provide history information on related elements of the alert transaction 1800. The history information may be linked through a plurality of fields or sub-fields. Previous alert transactions 1808 section may provide information on past transactions that were completed based on earlier events. The alert history screen capture may then allow current alert information to be reviewed in context with past alert history and transactions. While an investigation or review of a single event may not provide any meaningful insights or understandings, having historical and transactional data may be extremely valuable then in creating a contextual overview of behavior, events, or actions.

FIG. 19 represents a user interface for workload management report screen capture. Workload management filters 1900 section may contain a plurality of fields or sub-fields wherein information or values may be altered to affect the filtering of associated data. Such sub-fields may include organization or owner, scenario class or scenario, and age. Workload management report 1904 section may provide information related to the report generation. Information included in this section contains report generation date and time along with a segmentation of selected alerts based on age of the alert. Workload management detail 1908 section may provide specific alert information based on filtering elements provided in workload management filters 1900 section. In this section, information may be presented based on the filtering elements contained in the workload management filters 1900 section. The presented information may be grouped by organization and by owner. New alerts, open alerts, and reopened alerts columns may provide numeric values both for the number of alerts affect and the age of the alerts. The workload management detail 1908 section may also provide information on the average time of alert age by organization and for the total of each column, which may facilitate more efficient and effective workload process management.

FIG. 20 represents a user interface for alert disposition. Alert disposition filter 2000 section may contain a plurality of fields or sub-fields wherein information or values may be altered in affecting the filtering of associated data. Fields may include, without limitation, organization or owner, alerts created during a specific period, scenario class or scenario, and prioritization. Alert disposition report 2004 section provides information related to the alert disposition report. Filtering information provided in alert disposition filter 2000 may be confirmed in alert disposition report 2004 section along with summary information of the number of relevant alerts broken down into further classifications. The generated field provides a numeric value of the total number of alerts based on the filters. The Below Thresholds field is a numeric value for alerts that do not meet certain threshold limits. A user 128 may modify the threshold if the Below Thresholds value is too large. The System Autoclosed field represents a numeric value of alerts the system automatically evaluated and closed without requiring further review or investigation based on applying intelligence and system rules. Pending system autoclose are alerts that are in the process of being closed through user review and investigation. Alert disposition detail 2008 section provides specific alert information may be grouped based on filtering elements provided in alert disposition filter 2000 section. The alert information is group based on organization. Owners within the organization are further segmented with information provided based on their workload results. An additional category is also provided in the alert disposition detail 2008 section providing closing details. This category contains a plurality of columns in which alerts have been assigned. The numeric values in these columns and rows are related to the numeric values associated with individual owners. AWH refers to action withheld. IAE refers to invalid alert or system error. CO refers to case opened. DUP refers to duplicate. CTR refers to CTR filed. TTC refers to transfer. CS3 refers to close and suppress for 3 months. CS6 refers to close and suppress for 6 months. CSY refers to close and suppress for one year. SAR refers to suspicious activity report filed. Alert disposition definitions section 2012 contains definitions related to the alert disposition detail section 2008.

Figure 21:
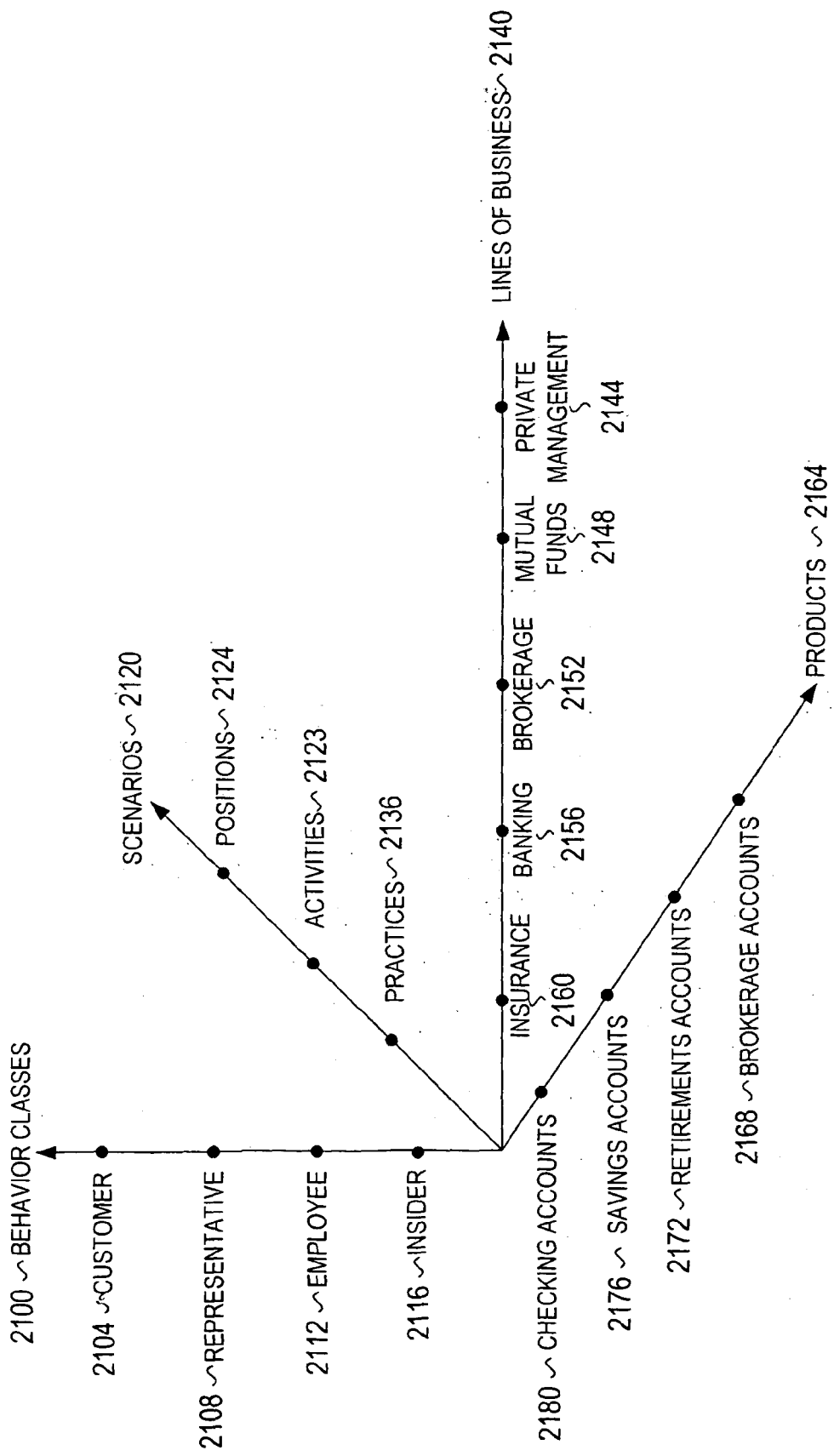
FIG. 21 illustrates an n-dimensional representation of the elements for broker and investor protection.

FIG. 21 is a representation of a plurality of axes that could be used when applying the advanced scenario-based alert generation and processing system 200. The behavior classes axis 2100 is represented as having customer 2104, representative 2108, employee 2112, and insider 2116 categories. Behavior classes 2100 is a general description for a variety of activities, events, or behaviors of interest the advanced scenario-based alert generation and processing system 200 is trying to detect. SEC rules and guidelines differ between customer 2104, representative 2108, employee 2112, and insider 2116. As a result, different considerations need to be taken into account in order to provide protection to impacted parties. The scenarios axis 2120 is an axis that represents a plurality of possible focus points in which the advanced scenario-based alert generation and processing system 200 may center its analysis and evaluation. In FIG. 21, Scenarios 2120 includes positions 2124, activities 2128, and practices 2136. In a general sense, positions 2124 includes a variety of securities such as stocks, bonds, options, commodities or similar assets. Activities 2128 represents a variety of activities monitored by the SEC including, but not limited to, active trading, marking the close, cross trades, improper short sales, and abusing auto-execution thresholds. These activities have the potential to undermine the integrity of financial markets through manipulation and other forbidden practices. Practices 2136 represents a range of activities including, but not limited to, front running, account churning, shadowing, insider trading, offering restricted securities, soliciting opposed trades, encouraging short-term holding, giving contradictory advice, trading below mutual fund points, and soliciting unapproved products. Lines of business 2140 represents a spectrum of entities in which the advanced scenario-based alert generation and processing system 200 may analyze data, events, transactions, and other types of information. Examples may include, but are not limited to, private management 2144, mutual funds 2148, brokerage 2152, banking 2156, and insurance 2160. Products 2164 represents a range of goods or services that the advanced scenario-based alert generation and processing system 200 may analyze including brokerage accounts 2168, retirement accounts 2172, savings accounts 2176, and checking accounts 2180. For behavior classes 2100, scenarios 2120, lines of business 2140, and products 2164, additional categories may be included or substituted by a user 126, administrator 138, or developer 104. The invention has the capability to analyze behaviors, events, and transactions across a plurality of categories within behavior classes 2100, scenarios 2120, lines of business 2140, and products 2164. For example, the invention has the ability of analyzing products 2164, across lines of business 2140, with a focus of activities 2128 in identifying customer 2104 activities. As the transformed data 212 is accessed, detection algorithms 228 applied, and the match generation 404 process performed an n-dimensional graph can be created based on a plurality of axis as illustrated in FIG. 21. By so doing, the invention may apply a variety of tests in identifying events, transactions, and behaviors of interest through plot, outlier, or vector analysis techniques.

The following section describes unique and advanced capabilities in detecting behavior, activities, and entities of interest primarily for the purposes of fraud or money laundering detection. These descriptions represent complex methods for identifying transactions, patterns, behaviors, and events associated with illegal activities. Some or all of these advanced scenarios may be contained in the scenario library 284, which is part of the advanced scenario-based alert generation and processing system 200.

The many features and advantages of the invention are apparent from the detailed specification. Thus, the appended claims are intended to cover all such features and advantages of the invention which fall within the true spirit and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Representative Code

The following text represents code that is representative of preferred embodiments of various functions and features described above. The description set forth below is only exemplary and the invention is not limited to the specific description set forth as representative code.

Link Analysis/Network Detection

Read input parameters: One or more datasets, list of internal node characteristics, description of external node characteristics, logic constraints.

For each dataset:

Read a row consisting of a From node, and To node, and a Link Type

If one existing networks contain either the From node or To node, then add this row to that network.

If one existing network contains the From node and a different existing network contains the To node, then merge those two networks and add this row to the merged network.

If no existing networks contain either the From node or To node, then create a new network consisting solely of this row.

Return to "Read a row" step until all rows are read from all datasets.

Examine each network that has been constructed, if it does not meet the minimum size parameter; delete it.

For each remaining node, if the node is of a prunable type and is only linked to one other node, discard it and all links associated with it.

Examine each remaining network, if it does not meet the minimum size parameter; delete it and all links and nodes that are members.

For each network: Capture Internal Characteristics (Number of nodes in the network, ID of the Primary Node in the network, Number of nodes to which the Primary Node is linked, Primary Node total measure (sum of the weight of the links associated with the Primary Node, both incoming and outgoing links), Primary Node incoming measure (sum of the weight of links with directionality into the Primary Node), Primary Node outgoing measure (sum of the weight of links with directionality away from the Primary Node), Number of links in the network, Average weight of the links in the network, Maximum weight of a link in the network, Earliest timestamp of a link in the network, Latest timestamp of a link in the network, Number of links with directionality into the Primary Node, Number of links with directionality away from the Primary Node, Number of links associated with the Primary Node with no directionality, Business ID of the Primary Node.

For each network: Capture External Characteristics. These are characteristics of the network that can only be measured by accessing external data sources in conjunction with the network nodes.

Compare each network against Logic Constraints.

Create a match for each network that matches the Logic Constraints.

Output all Matches.

Sequence Detection

Read input parameters: One or more Datasets, Sequence pattern. Sequence pattern consists of:

A Top Level Sequence Node. The Top Level Sequence Node contains a "Longest/Shortest" flag that tells whether the longest or shortest match found should be saved. The Top Level Sequence Node can contain a "Distance Range" that specifies the time range within which the matched rows must fall.

Sequence Nodes have one or more child nodes. The node types of these children can be: another Sequence Node, an Or Node, a Row Node.

Sequence Nodes can contain a "Looping Range" that specifies how many times the Sequence may match.

Or Nodes can have one or more child nodes. The node types of these children can be: another Sequence Node; an Or Node, a Row Node.

Row nodes contain the following parameters:
A dataset to be matched ("Dataset")
A "Looping Range"
A Boolean logic constraint ("Logic Constraint")
A set of variable to bind ("Variables") and expressions for calculating the Variable's value ("Expressions")
A Record/No-record Flag Initialize datasets
Read each Dataset. Each Dataset has a list of fields that should be used to sort the dataset.
Sort each dataset individually.

Find matches:
Select the next row to be matched. If there are multiple datasets, this is done by examining the next row in each individual dataset and picking the one with the lowest value of shared ordering attributes.
Create a Partial Match State positioned at the Top Level Sequence Node.

For each Partial Match State
If it is positioned at a Sequence Node, create a new Partial Match State positioned at the first child node. The new Partial Match State is added to the list of States yet to be evaluated.
If it is positioned at an Or Node, create a new Partial Match State for each child node. Position each at the corresponding child node. The new Partial Match States are added to the list of States yet to be evaluated.
If it is positioned at a Row Node, do the following:
Check if the dataset row comes from the same dataset as the Dataset specified in this Row Node.
If so, proceed to next step. Otherwise continue with the next Partial Match State.
Compare the Logic Constraint to the Dataset rows contents.
If Logic Constraint evaluates to true, proceed to next step. Otherwise continue with the next Partial Match State.
Bind all Variables to value resulting from evaluating corresponding Expression.
If Record/No-record flag is set to Record, store matched row to be output with alert.
Create new Partial Match States that point to nodes following this Row Node. If this Row Node is a child of a Sequence Node, then a new state is added positioned at the next child. If this Row Node has a Looping Range that has not reached its maximum value, then also create a new state positioned at this Row Node. If this Row Node is a child of an Or Node or the last child of a Sequence Node then also create a new state positioned after the parent node. If this Row Node the last child of a Sequence Node that has a Looping Range that has not reached its maximum value, then also create a new state positioned at the parent Sequence Node. These new Partial Match States are saved until the next dataset row is read.

If it is positioned after the last child of the Top Level Sequence Node, then create a Match consisting of matched rows and bound Variables if the time between the first matched event and the last matched event within the Top Level Sequence Node's Distance Range. If a previous Match exists that started with the same dataset row, then:
If the Top Level Sequence Node Longest/Shortest flag is set to Longest, throw out previous match and keep this match.
If the Top Level Sequence Node Longest/Shortest flag is set to Shortest, throw out this match and keep previous match.

Return to initial step, "Select the next row to be matched" unless there are no more rows to examine in any datasets.

Output all matches.

Outlier Detection

Read input parameters: Dataset and Outlier Detection Pattern. Outlier Detection Pattern consists of:

Multiple sets of one or more Dimensions ("Dimension Set"). Each Dimension is mapped to a field in the dataset.

A Target Point. This is a value for each Dimension in each Dimension Set.

A Neighborhood Size.

A Minimum Dimension Set Count.

Find matches:
For each Dimension Set
For each row in the dataset, calculate the distance between that row and the target point (both as projected onto the Dimension Set).
Find the K rows closest to the target point where K=Neighborhood Size. These K rows compose this Dimension Set's Neighbors.
For each row in the dataset, count the number of Dimension Sets that include that row as a Neighbor.
If that count is >=the Minimum Dimension Set Count, create a match for that row consisting of the row.
Output all matches.

Rules-Based Detection

Read input parameters: Primary Dataset, zero or more Secondary Datasets, Rule pattern. Rule pattern consists of (for each dataset):

Set of Boolean logic constraints ("Logic Constraints")
  A number range constraining the number of rows matched ("Rows Matched Range")
  A set of variable to bind ("Variables") and expressions for calculating the Variable's value ("Expressions")
  A Record/No-record Flag
  A field in dataset that maps to Scenario Focus ("Focus Field")
  Find matches:
  Read row from Primary Dataset.
  Compare Primary Dataset's Logic Constraints to row contents.
  If Primary Dataset's Logic Constraints evaluate to true, then proceed to next step. Otherwise go back to "Read row from Primary Dataset" step.
  Bind all Variables to value resulting from evaluating corresponding Expression.
  If Record/No-record flag is set to Record, store matched row to be output with alert.
  Bind Focus to value in Focus Field
  For each Secondary Dataset:
    Read rows from Secondary Dataset with Focus Field value matching Focus.
    For each row, compare Secondary Dataset's Logic Constraint to row contents.
    Count number of rows that match Logic Constraint.
    If count is within Rows Matched Range, then proceed to next step. Otherwise, go back to "Read row from Primary Dataset" step.
    Bind all Variables to value resulting from evaluating corresponding Expression.
    If Record/No-record flag is set to Record, store matched rows to be output with alert.
  Create alert. If constraint is met for Primary Dataset and Rows Matched Range is satisfied for all Secondary Datasets, then create alert consisting of Focus, recorded rows and variables.
  Return to "Read row from Primary Dataset" step.

Output all alerts

Prioritization

Read input parameters: Set of Matches, Match Prioritization Strategy Logic

For each Match in Set of Matches:
  Set Match Score (MS)=0
  If Scenario Lookup Strategy is included in Match Prioritization Strategy Logic, then look up Score (S) associated with this Match's Scenario. MS=MS+S.
  If Simple Lookup Strategy is included in Match Prioritization Strategy Logic, then compare the value of the specified Match Binding with the associated value in the Simple Lookup Strategy. If the two are equal, then look up the Score (S) associated with the Simple Lookup Strategy. MS=MS+S.
  If Graduated Lookup Strategy is included in the Match Prioritization Strategy Logic, then:
    Look up the Scoring Input Value (SW) of the specified Match Binding.
    Read parameters from the Graduated Lookup Strategy: Lower Value (LV), Minimum Value (MW), Upper Value (UV), Max Value (MAV)
    Compute the rise of the point value (M) between the lower and upper bounds. $M=(MAV-MIV)/(UV-LV)$ $MS=MS+(M*(SIV-LV)+MIV)$ If Graduated Count Strategy is included in Match Prioritization Strategy Logic:
    Read parameters from the Graduated Count Strategy: Time Window (TIM), Lower Value (LV), Minimum Value (MW), Upper Value (UV), Max Value (MAV), Same Scenario (SS)
    Find the count (CO) of prior matches within TIM that have the same Focus as this Match. If SS is "Yes" then only include matches that are the same scenario as this Match.
    Compute the rise of the point value (M) between the lower and upper bounds.

$M=(MAV-MIV)/(UV-LV)$ $MS=MS+(M*(CO-LV)+MIV)$

Output Set of Prioritized Matches (matches can be prioritized by Match Score)

Grouping

Read input parameters: Set of Prioritized Matches, Match Grouping Strategy

If the Match Grouping Strategy is "Bind Match" then group Matches together that have the same Focus and have the same Match Binding values for a set of Match Bindings specified in the Match Grouping Strategy.
  If the Match Grouping Strategy is "Bind Behavior Scenario" then group Matches together that have the same Focus, the same Scenario, and the same Match Binding values for a set of Match Bindings specified in the Match Grouping Strategy.
  If the Match Grouping Strategy is "Single Alert Match" then each Match is its own group.
  Output groups of Matches. Groups of one are also groups.

Alert Prioritization

Read input parameters: Set of Match Groups, Alert Prioritization Strategy Logic

Each Match Group is an Alert. Set of Match Groups is Set of Alerts.

For each Alert in Set of Alerts:
  If Max Match Score is specified in Alert Prioritization Strategy Logic, then Alert Score is set to maximum of scores of matches in this Alert.
  Else if Avg Match Score is specified in Alert Prioritization Strategy Logic, then Alert Score is set to average of scores of matches in this Alert.
  Output Set of Prioritized Alerts (Alerts can be prioritized by Alert Score).

Scenarios and Behaviors

BIP 0060—Customers with Concentrated Positions in a Single Security

Abbreviated Name
  Concentrated Position
  Scenario Objective

This scenario identifies customers who have an undiversified portfolio and are trading on margin. Investment portfolios that are over-weighted in a single equity are more volatile than those that are diversified among a set of securities. Consequently, customers with a concentrated position in a single security are susceptible to experiencing a substantial loss over a short period of time. The risk is amplified if the customer is trading on margin and has a relatively low equity percentage.

Scenario Implementation Approach

The level of risk resulting from a concentrated position is based on the market value of the concentrated position, the percentage concentration in the security (measured relative to the total cash and security value), and the equity percentage in the account or household.

For the purposes of this scenario, a concentrated position situation is generally defined as an instance where:

Concentrated Position Market Value Long >=$X
Concentration Level in Single Security >=Y %
Equity Percentage <=Z %
Margin Debit <=$W The scenario has four detection tracks:

Account Focused/Static—Finds all cases where an account meets the criteria specified above, based on the most recent data available.

Account Focused/Recent Change—Finds cases where an account meets the criteria using the most recent data available, but did not meet the criteria at the end of the previous month. Also includes accounts that met the criteria the previous month, but have changed significantly in the direction of interest since then.

Household Focused/Static—Finds all cases where a household as an aggregate meets the criteria above, but none of the component accounts meet the criteria individually. To be of interest, at least two accounts within the household must be concentrated in the same security and be trading on margin.

Household Focused/Recent Change—Finds household-level matches (where the household meets the criteria but the component accounts do not) for households that meet the criteria based on the most recent data available, but did not meet the criteria at the end of the previous month. Also includes matches for households that met the criteria the previous month but have changed significantly in the direction of interest since then.

Parameters

FIG. 27 shows the parameters for the Customers with Concentrated Positions in a Single Security scenario.

Focal Types
Account
Household
Highlights
Account: Symbol=XX, Conc Posn MVL=$$, AC Net Worth=$$, Eqty %=%%
Household: Symbol=XX, Conc Posn MVL=$$, HH Net Worth=$$, Eqty %=%%
Application Frequency
Monthly BIP 0080—Customers with a Concentrated Position in Low-Priced Equities Abbreviated Nam
Low-Priced Equities Conc
Scenario Objective This scenario identifies customers that have a substantial portion of their assets invested in low-priced equities. These securities pose special risks for investors because they often experience wide price fluctuations, sometimes have unproven track records, and may have lower liquidity than other stocks. Investors that are concentrated in low-priced equities are susceptible to experiencing a substantial loss over a short period of time.

Scenario Implementation Approach

Low-priced stocks are defined as equities with a price of less than $5.00. For the purposes of this scenario, a concentrated position in low-priced equities is generally defined as a situation where:

Low-Priced Equities Balance >=$X
Low-Priced Equities Balance/Total Cash and Security Value >=Y %

The scenario has four detection tracks:

Account Focused/Static—Finds all cases where an account meets the criteria specified above, based on the most recent data available.

Account Focused/Recent Change—Finds cases where an account meets the criteria using the most recent data available, but did not meet the criteria at the end of the previous month. Also includes accounts that met the criteria the previous month, but have changed significantly in the direction of interest since then.

Household Focused/Static—Finds all cases where a household as an aggregate meets the criteria above, but none of the component accounts meet the criteria individually.

Household Focused/Recent Change—Finds household-level matches (where the household meets the criteria but the component accounts do not) for households that meet the criteria based on the most recent data available, but did not meet the criteria at the end of the previous month. Also includes matches for households that met the criteria the previous month but have changed significantly in the direction of interest since then.

Parameters

FIG. 28 shows the parameters for the Customers with a Concentrated Position in Low-Priced Equities scenario.

Focal Types
Account
Household
Highlights
Account: Low-Priced MVL=$$, % Port Conc=%%, AC Net Worth=$$
Household: Low-Priced MVL=$$, % Port Conc=%%, HH Net Worth=$$
Application Frequency
Monthly BIP 0110—Customers Who May Be Abusing Auto-Execution Systems Abbreviated Name
Multiple Option Auto Executions
Scenario Objective This scenario identifies instances in which a customer may be attempting to split an order that would exceed an auto-execution size limit into several orders that are within the limit. The customer's aim in doing this would be to achieve a more rapid execution or a superior execution price. Exchanges have rules prohibiting this activity, and member organizations are responsible for establishing procedures to prevent their customers from violating these rules.

Scenario Implementation Approach

The key parameters used in the detection process are the size limit within which an order may be eligible for auto-execution, and the time interval within which a series of orders may constitute a rules violation. The detection process may generate an alert on a series of orders for a particular security if the following conditions are met:

All of the orders are on the same side of the market.
The total time span between the orders is less than a prescribed time threshold.
The quantity of each order is less than the auto-execution threshold.
The total quantity of the orders exceeds the auto-execution threshold.
The orders originate from the same account or multiple accounts in the same household.
The orders are entered during regular trading hours.

An account-focused alert may be generated if all of the orders involved in the sequence are from the same account; otherwise, a household-focused alert may be generated.

The detection process uses separate time and quantity thresholds for equities and options. At the current time, auto-execution abuse is not applicable to most equity securities. The equity variation of this scenario is limited to exchange-traded funds, which are eligible for auto-execution under a pilot program instituted by the American Stock Exchange.

Parameters

FIG. 31 shows the parameters for the Customers Who May Be Abusing Auto-Execution Systems scenario.

Focal Types
Account
Household
Highlights
Symbol=XX, # Orders=##, Total Qty=##
Application Frequency
Daily BIP 0120—Customers Who May Be Marking the Close Abbreviated Name
Execution Near Mkt CLose
Scenario Objective Marking the close is a form of market manipulation in which an investor performs a purchase or sale of a security near the end of the day's trading, with the objective of affecting the reported closing price. This scenario identifies instances in which a customer may be attempting to mark the close in order to avoid a margin call—either in the same account that placed the trade or in a different account in the same household.

Scenario Implementation Approach

The parameters of interest in identifying this behavior are the proximity of a customer's order(s) to the end of market hours, and the extent to which the circumstances in the customer's account or household suggest a motivation for influencing the closing price of a security. The detection process identifies cases where:

An account places and executes one or more orders for an equity security within X minutes of the end of regular trading hours.

An account in the same household holds a margin position in the security that is at least Y times the quantity traded in (1), and is on the side of the market that would benefit from the expected price movement (i.e., the position is long if the order is a buy, or short if the order is a sell).

The account from (2) is no more than Z points above its margin maintenance percentage.

If multiple accounts in the same household are involved in this behavior—i.e., if one account is marking the close to help a different account avoid a margin call—the detection process may generate a household alert. If the activity of interest is confined to one account, the detection process may generate an account alert.

Parameters

FIG. 32 shows the parameters for the Customers Who May Be Marking the Close scenario.

Focal Types
Account
Household
Highlights
Symbol=XX, Shr Qty=##, Buy/Sell=XX, Order Time=HH:MM:SS
Application Frequency
Daily BIP 0130—Customers Who May be Making Improper Short Sales Abbreviated Name
Long Sale w/o Long Posn
Scenario Objective Customers who sell a security they do not own in their account must declare the transaction to be a short sale, or commit to delivering the shares of the security involved through an issue cashiering transaction. This scenario identifies cases in which a customer sells an equity security that is not long in his/her account, does not declare the transaction to be a short sale, and subsequently closes the position by buying back the security rather than delivering the shares. A customer may be motivated to do this because the security involved cannot be sold short (e.g., IPO shares), or to avoid paying margin interest on the borrowed shares.

Scenario Implementation Approach

The detection process identifies the following sequence of activity as an improper short sale:

A customer makes an "opening" trade to sell shares of an equity security from a long account (i.e., sells shares that are not long in the account thereby opening a negative position).

The customer subsequently makes a "closing" trade to buy back some or all of the shares of the security sold in (1).

Within 10 days after the sale from (1), the customer does not deliver the shares required to close the short position.

The detection process requires that an account perform at least X improper short sales over the course of one-month to qualify for an alert.

Parameters

FIG. 33 shows the parameters for the Customers Who May Be Making Improper. Short Sales scenario.

Focal Types
Account
Highlights
# of Improper Short Sales=XX
Application Frequency
Monthly BIP 0140—Customers Making Cross-Trades Away from the Market Abbreviated Name
Possible Extended-Hrs Cross Trd
Scenario Objective Trading during extended-hours sessions is often illiquid. Customers may take advantage of this situation to execute prearranged trades that are away from the market price of the security involved. There are a variety of motivations for doing this, such as: disguising the transfer of assets between two accounts; evading IRS gift rules or other tax laws; laundering money; creating a gain or loss for tax purposes; or generating artificial trading activity to lure other investors into making an ill-advised trade. This scenario identifies cross-trades that are away from the market based on the recent closing price and the price of the prior executions in the extended-hours trading session.

Scenario Implementation Approach

Two executions are identified as a possible cross-trade if they meet the following criteria:

Occur during extended hours trading
Involve the same security
Have the same execution price
Have the same execution date and time
Are on opposite sides of the market The detection process finds cross-trades that are away from the market price, defined as cases where:

Execution Price Difference Versus Closing Price >=X %

Execution Price Difference Versus Previous Execution >=X %

The percentage price differential criteria used here refer to absolute changes relative to the closing price and the prior execution price. The changes may be positive or negative.

Price changes that are the result of a market-moving trend are not of interest for this scenario. To identify these situations, the detection process examines all subsequent executions in the cross-traded security for the remainder of the extended-hours session. The detection process counts the number of executions—from accounts in different households than the ones involved in the cross-trade—that are within Y % of the cross-trade price, or are further away from the previous market price. If this count is at least Z, the execution price of the cross-trade is attributed to a market-moving trend, and the detection process may not create an alert on the cross-trade.

The detection process produces alerts on the account performing the Buy side of the cross-trade. To avoid redundancy with other scenarios, this scenario does not cover cases in which the accounts involved in a cross-trade are in the same household, are managed by the same investment advisor, or consist of an account belonging to a firm employee and one belonging to a non-employee:
Parameters
FIG. 34 shows the parameters for the Customers Making Cross-Trades Away from the Market scenario.
Focal Types
Account
Highlights
Symbol=XX, Exec Price=$$, Recent Closing Price=$$
Application Frequency
Daily BIP 0180—Representatives Who May be Encouraging Orders but Marking them
As Unsolicited
Abbreviated Name
Unsol Order Pattern
Solicited/Unsolicited in Same AC
Scenario Objective Brokerage firms must maintain accurate records regarding whether a member of the firm solicited customer transactions. This scenario identifies cases in which a representative may be encouraging customers to place certain orders, but is marking the orders as unsolicited. A representative may be motivated to do this if recording the orders as solicited could be construed as a violation of firm policies, such as performing solicitations outside of firm guidelines or over-soliciting a particular security.

This behavior may manifest itself in two ways:
Unsolicited Order Pattern—Cases where a representative enters an unexpectedly large number of unsolicited orders for a particular security.
Solicited and Unsolicited Trades in the Same Account—Cases where a representative enters both solicited and unsolicited orders from the same customer account in a short period of time.

For the first variation, the scenario also identifies instances in which this behavior is observed across an employee cost center.

Scenario Implementation Approach

The detection process is separated in to three tracks that identify patterns of unsolicited orders by a representative; patterns of unsolicited orders by an employee cost center; and occurrences of solicited and unsolicited orders for the same customer account by a representative. Representatives who perform special trading functions or operations are not considered, because their jobs sometimes entail performing a large number of trades in a particular security. The representatives considered for this scenario are those who are involved in conventional interactions with customers—specifically, those who work in branch offices, service teams, or call centers. Orders for money market funds are excluded from consideration in this scenario. Activity in all other types of securities is included.

Unsolicited Order Pattern—Representative

The parameters of interest in identifying representatives who perform a suspiciously high number of unsolicited trades in a particular security are: the number of unsolicited trades in the security, the ratio of actual versus expected unsolicited orders, and the percentage of the orders that are on the same side of the market.

Representatives working in service teams or call centers typically handle a much higher volume of trades than their branch office counterparts. To account for this difference, the detection process uses separate thresholds for service team/call center representatives and branch representatives.

The detection process aggregates each representative's order entry activity over a one-month period, and identifies cases in which a representative's orders in a particular security meet the following criteria:
The number of unsolicited orders entered by the representative is at least A times the expected number of orders for the security. The expected number of orders is computed based on the total number of orders taken by the representative and the firm-wide percentage of orders that are for a particular security.
At least B % of the orders are on the same side of the market.
The total number of orders received on one side of the market is at least C for service team/call center representatives, or at least D for branch representatives.
The number of distinct accounts involved in placing the orders is at least E for service team representatives, or at least F for branch representatives.

Unsolicited Order Pattern—Employee Cost Center

The detection process identifies cases in which the aggregate activity performed in a cost center meets the Unsolicited Order Pattern criteria described above, but no single representative meets the criteria individually. The representative-focused variation of the detection process uses separate thresholds for branch representatives and service team/call center representative. The minimum thresholds for service team/call center personnel—the higher of the two condition sets—are used in evaluating activity at the employee cost center level.

Solicited and Unsolicited Trades in the Same Account

The detection process identifies cases in which the order entry activity performed by a representative for a single customer account meets the following criteria:
Number of Unsolicited Orders >=G
Number of Solicited Orders >=H
Total Days Between Orders <=I
Parameters
FIG. 35 shows the parameters for the Representatives Who May Be Encouraging Orders But Marking Them As Unsolicited scenario.
Focal Types
Representative
Business Unit
Highlights
Unsolicited Order Pattern-Representative: Symbol=XX, Unsol Trd=##, # of AC=##

Unsolicited Order Pattern-Business Unit: Symbol=XX, Unsol Trd=##, # of AC=##
Solicited/Unsolicited in Same AC: Sol Trd=##, Unsol Trd=##, AC=123
  Application Frequency
  Monthly BIP 0190—Representatives Who May be Encouraging Short-Term Holding
  Abbreviated Name
  Short-Term Holding
  Scenario Objective This scenario identifies cases in which a representative may be encouraging a customer to perform short-term trading in a particular security.
  Scenario Implementation Approach This behavior is recognized by the occurrence—in a period of 30 days or less—of a representative entering both a buy and a sell order for the same security in the same customer account, with at least one of the orders being indicated as solicited. Several types of activity are excluded from consideration:
- Trades in money market securities are excluded because short-term holding in these securities is not unusual or inappropriate.
- Representatives who perform special trading functions or operations are not considered, because their activities may create the false appearance of short-term trading behavior. The representatives considered for this scenario are those who are involved in conventional interactions with customers—specifically, those who work in branch offices, service teams, or call centers.

Parameters
  None
  Focal Types
  Representative
  Highlights
  AC #=123, Symbol=XX, Days Held=##
  Application Frequency
  Monthly BIP 0230—Representatives Who Solicit Orders but Mark them as Unsolicited
  Abbreviated Name
  Rec Order Inconsistency
  Scenario Objective To comply with regulatory reporting requirements, it is important for brokerage firms to maintain accurate records regarding whether a member of the firm solicited customer transactions. This scenario identifies possible reporting discrepancies. The scenario finds cases in which a representative enters a customer order that is consistent with a recommendation he/she previously made to the customer, but marks the order as unsolicited. This behavior may simply be an oversight by the representative, but it may also be a sign of a more serious issue such as a representative making inappropriate recommendations to customers.
  Scenario Implementation Approach The detection process identifies cases in which a representative documents a solicitation attempt to a customer account, and subsequently—on the same day or the next trading day—enters an unsolicited order that is from the same customer, for the same security, and on the same side of the market as the recommendation. The detection process covers all representatives and all types of securities except money market funds.
  Parameters
  None
  Focal Types
  Representative
  Highlights
  AC#=123
  Application Frequency
  Daily BIP 0250—Employees Shadowing a Customer Account
  Abbreviated Name
  Possible Emp Shadowing
  Scenario Objective Employees who enter or review orders may believe that particular customers have inside knowledge about certain securities, or are especially good investors. Consequently, employees sometimes attempt to mimic a customer's trades in their own accounts, hoping to profit from the information on which the customer is trading. Activity of this sort may be a violation of regulatory conduct rules. This scenario identifies cases in which an employee places an order that is either similar to a customer's trade he/she entered, or is similar to an order placed by a customer with a controlling interest in the security involved.
  Scenario Implementation Approach The detection process is separated into three tracks that identify possible shadowing of equity/options trades, possible shadowing of trades in other securities, and possible shadowing of trades by customers with a controlling role in the security involved. None of the detection tracks consider orders in money market funds. Trades that are the result of option assignments or exercises are also not considered in this scenario.
  Orders for Equities and Options The detection logic identifies activity that meets the following conditions:

An employee enters an order for an equity or option security, either from a customer account or a firm account.

The order from (1) must meet minimum size requirements defined as follows:
  Equities
  Principal Amount >=$A Or Share Quantity >=B
  Options
  Principal Amount >=$C Or Contract Quantity >=D Within E hours of entering the order, the employee places an order that is for the same security or a related security, and is on the same side of the market as the order from (1). Related securities are identified as those with a common "issuer" number (the first six characters of the CUSIP number). The employee's order may take place in any account with which he/she is associated—either through a direct role or a family member linkage.

The employee's order from (3) must meet minimum size requirements defined as follows:
  Equities
  Principal Amount >=$F Or Share Quantity >=G
  Options
  Principal Amount >=$H Or Contract Quantity >=I
  Orders for Other Securities Orders that are not for equities or options (orders for mutual funds, bonds, etc.) are of less interest for possible shadowing, because it is less likely that an employee could profit from a customer's information about one of these securities. For these securities, the detection process identifies cases in which an employee shadows at least two orders that he/she has received from the same account within a period of two trading days.
  Orders by Customers with a Controlling Role in a Security Mantas data tables store a list of firm customers that are owners, officers, or 10% shareholders of a particular security.

When one these customers places a trade in the security in which he/she has a controlling interest, an employee who becomes aware of this trade may attempt to capitalize on the information by placing a similar order in one of his/her accounts.

The detection logic identifies activity that meets the following conditions:

A customer places a trade in the security in which he/she has a controlling interest, or in a related security. Related securities are identified as those with a common "issuer" number (the first six characters of the CUSIP number).

The controlling customer's order from (1) must meet minimum size requirements defined as follows:
Equities
Principal Amount >=$K Or Share Quantity >=L
Options
Principal Amount >=$M Or Contract Quantity >=N Within J hours, of the customer's order, an employee places an order that is for the same security or a related security, and is on the same side of the market as the order from (1). The employee does not need to be the person who took the customer's order. Employees who are aware of a customer's role on a particular security may attempt to monitor the customer's activity. The employee's order may take place in any account with which he/she is associated—either through a direct role or a family member linkage.

The employee's order from (3) must meet minimum size requirements defined as follows:
Equities
Principal Amount >=$P Or Share Quantity >=Q
Options
Principal Amount >=$R Or Contract Quantity >=S
Parameters FIGS. 39A and 39B show the parameters for the Employees Shadowing a Customer Account scenario.
Focal Types
Employee
Highlights
Equities/Options: Symbol=XX, Cust AC #=123, Ord Time Diff=HH, Emp Ord Qty=##
Other Securities: Cust AC #=123
Control Customers: Symbol=XX, Cntrl Cust AC #=123, Ord Time Diff=HH, Emp Ord Qty=##
Application Frequency
Daily BIP 0260—Possible Front-Running by Order-Taker
Abbreviated Name
Possible Front-Running By Rep
Scenario Objective A single large order may move the price of a security. Employees who have prior knowledge of such an order may attempt to profit from this price movement by trading ahead of the order in their own account or a family member's account. Activity of this sort is a violation of regulatory conduct rules. This scenario identifies instances in which a representative trades ahead of a large order that he/she entered.

Scenario Implementation Approach

The detection logic identifies activity that meets the following conditions:

An account associated with an employee—either through a direct role or a family member linkage—places an order for a particular security.

Within X seconds, the employee from (1) enters a large order that is for the same security (or a related security) and is on the same side of the market. Related securities are identified as those with a common "issuer" number (the first six characters of the CUSIP number). The large order may originate from a customer account or a firm proprietary account. If the customer/firm account order is for an option security, the employee order must be for the same option series; otherwise all related securities are considered to be of interest.

Both the employee order from (1) and the order from (2) must meet requisite size minimums to be considered of interest. For equities and options, the trade size threshold is expressed in terms of unit quantity; for bonds and other securities, the size threshold is expressed in terms of principal amount. Separate thresholds are used for the employee and non-employee orders.

The detection process covers all securities in which a large order may affect the short-term trading price—mutual funds and money market funds are excluded from consideration. Allocation trades, in which a block order is distributed to a series of accounts, are not considered for this scenario.
Parameters FIG. 40 shows the parameters for the Possible Front-Running By Order-Taker scenario.
Focal Types
Employee
Highlights
Symbol=XX, Ord Time Diff=HH:MM:SS, Prop AC=Y/N
Application Frequency
Daily BIP 0270—Possible Front-Running by Employ
Abbreviated Name
Possible Front-Running By Emp
Scenario Objective A single large order may move the price of a security. Employees who have prior knowledge of such an order may attempt to profit from this price movement by trading ahead of the order in their own account or a family member's account. Activity of this sort is a violation of regulatory conduct rules. This scenario identifies cases in which an employee—other than the representative who took the order—places a trade narrowly before a large order for the same security, benefits from the price movement in the security, and subsequently secures a profit by placing an offsetting trade. The connection between the employee and the order is circumstantial in this scenario—the employee is not the order-taker, but may have obtained knowledge of the order by overhearing another employee, checking the open-order file, or receiving a tip.

Scenario Implementation Approach

The detection logic identifies activity that meets the following conditions:

An account associated with an employee—either through a direct role or a family member linkage—places an order for a particular security.

Within X seconds, a large customer or firm account order is received for the same security (or a related security) on the same side of the market. This order must be entered through a non-automated channel. Related securities are identified as those with a common "issuer" number (the first six characters of the CUSIP number). If the customer/firm account order is for an option security, the employee order must be for the same option series; otherwise all related securities are considered to be of interest.

The account from (1)—or a-different account associated with the same employee—places a trade that offsets the initial order within Y seconds of the large order from (2). The employee must secure a profit of at least $Z from the trades surrounding the large order for the situation to be considered of interest.

The large order from (2) must meet requisite size minimums to be considered a viable candidate for front-running. For equities the trade size threshold is expressed in terms of unit quantity or principal amount; for options, the minimum is expressed in terms of contract quantity; for bonds, the size threshold is expressed in terms of principal amount. Among equities, separate thresholds are used for high-volume equities—those with a 10-day average trading volume above 8 million shares per day—and other equities. The rationale for differentiating between these securities is that heavily traded equities are less susceptible to experiencing a significant price movement from a single order and therefore must be of a larger size to be a candidate for front-running. The employee's orders do not have minimum thresholds. The profit minimum described in (3) ensures that the employee's order must be of sufficient size, to be of interest.

The detection process covers all securities in which a large order may affect the short-term trading price—mutual funds and money market funds are excluded from consideration. Allocation trades, in which a block order is distributed to a series of accounts, are not considered for this scenario. To avoid overlap with other alerts, this scenario excludes cases in which the same representative who enters the market-moving order also performs the front-running activity.

If the front-running activity takes place in an account that is designated as an employee account (i.e., is in the EB branch) but is not linked to a specific employee, the detection process may generate an alert on the account. If an account involved in this behavior is associated with more than one employee, an alert may be generated on each employee.

Parameters

FIG. 41 shows the parameters for the Possible Front-Running By Employee scenario.

Focal Types
Employee
Account
Highlights
Symbol=XX, Ord Time Diff=HH:MM:SS, Profit=$$, Prop AC=Y/N
Application Frequency
Daily BIP 0280—Employees Trading on Insider Information
Abbreviated Name
Possible Emp Insider Info
Scenario Objective Firm employees are prohibited from trading a security on the basis of material nonpublic information. This scenario identifies instances in which an employee places a trade ahead of a market-moving news announcement in a particular security. This situation may be an indication that the employee was in possession of insider information.

Scenario Implementation Approach

For a particular business day, the detection process identifies the securities that are candidates for insider trading as being those securities that were the subject of a Dow Jones News announcement—on the current day or after market close on the previous trading day—and meet the following conditions:

Percentage Change in Closing Price Versus Previous Day >=X %
Change in Closing Price Versus Previous Day >=$0.50

The price differential criteria—in dollar and percentage terms—refer to absolute changes in a security's closing price. The changes may be positive or negative.

The detection process identifies employee trades that occur ahead of a news announcement. To be of interest, a trade must:

Originate from an account associated with an employee—either through a direct role or a family member linkage.

Involve one of the candidate securities identified above or a related security. Related securities are identified as those with a common "issuer" number (the first six characters of the CUSIP number).

Occur on the current day—the day of the significant price movement—or the previous trading day.

Be on the side of the market that benefited from the price change.

Have an order time that precedes the news announcement. If multiple announcements occur, the employee's trade must be placed in advance of the last announcement.

Be executed in time to take advantage of at least Y % of the price movement in the security.

If possible insider-trading activity takes place in an account that is designated as an employee account (i.e., is in the EB branch) but is not linked to a specific employee, the detection process may generate an alert on the account. If an account involved in this behavior is associated with more than one employee, an alert may be generated on each employee.

Parameters

FIG. 42 shows the parameters for the Employees Trading On Insider Information scenario.

Focal Types
Employee
Account
Highlights
Symbol=XX, Shr Qty=##, News Time=Price Change (%) %%
Application Frequency
Daily.

BIP 0530—Mutual Fund Switch
Abbreviated Name
Mutual Fund Switch
Scenario Objective Mutual funds are typically considered long-term investments. Switching from one mutual fund to another over a short-term period may be an ill-advised strategy, and may needlessly impose commission charges, load fees, or tax liabilities on the investor. This scenario identifies cases in which a customer sells a mutual fund he/she has held for less than six months, uses the proceeds to purchase another mutual fund, and one of the trades involved in the switch—either the sale of the original fund or the purchase of the new fund—was solicited by a representative.

Scenario Implementation Approach

This scenario finds cases in which an account performs the following sequence of activity:

The customer purchases one or more mutual funds.
The customer performs a sale in the same fund(s) from (1) within 180 days.
The customer buys shares of one or more different mutual funds within 7 days of the sell trade from (2).

The following conditions must hold for the detection process to generate an alert:

At least one of the trades from (2) or (3) must be solicited by a representative.
The principal amount for each of the trades must be at least $10K.
The proceeds of the mutual fund sales from (2) must be at least X % of the amount bought in (1).

Parameters

FIG. 48 shows the parameters for the Mutual Fund Switch scenario.

Focal Types

Account
Highlights
Days Held=DD, Sold=XX, Amt Sold=$$, Bought=XX, Amt Bought=$$
Application Frequency
Daily BIP 0620—IA IPO Allocations
Abbreviated Name
IA IPO Allocations
Scenario Objective This scenario identifies situations in which an investment advisor performs a disproportionate allocation of "hot" IPO shares among its subaccounts. This activity may be an indication that the IA is giving special treatment to a preferred group of subaccounts. The behavior is especially interesting if the IA owns one of the accounts receiving a lopsided allocation.

Scenario Implementation Approach

For the purposes of this scenario, a hot IPO is defined as one for which:

The closing price is at least A % higher than the initial trading price.

Or

The closing price is at least B points higher than the initial trading price.

For each hot IPO, the detection process computes the expected percentage of the IA's total IPO shares that would be allocated to each subaccount, based on the subaccount's net worth relative to the total assets managed by the IA. The detection process then computes the actual percentage of the IPO shares that were allocated to each subaccount. The scenario identifies situations in which the percentage allocation to a single subaccount is very large, or is moderately large and is much higher than the expected allocation share. Specifically, a lopsided allocation is defined as a situation in which:

Subaccount Allocation %>=X %

Or

Subaccount Allocation %>=Y % And Ratio Actual/Expected Allocation >=Z

Parameters

FIG. 51 shows the parameters for the IA IPO Allocations scenario.

Focal Types
Investment Advisor
Highlights
Cust AC #=123, Symbol=XX, Offering Price=$$, Closing Price=$$
Application Frequency
Daily BIP 0630—IA Block Trade Allocations
Abbreviated Name
IA Block Trd Allocations
A Block Trd Allocations—Day Trd
Scenario Objective Block trading is performed in two stages: an initial large trade by an IA master account, followed by a series of smaller trades that distribute the shares to the IA's subaccounts. The trading price is locked-in at the time of the initial trade. At the point that the shares are distributed, the price of the security involved may have changed in a positive or negative direction. This scenario looks for instances in which an IA may be not be allocating block trades fairly among its subaccounts. There are two ways in which this behavior may be evident:

The IA may allow time to elapse between the initial block trade and the allocation to its subaccounts. If the price of the security changes prior to the allocation, the IA may intentionally apportion the shares of the block trade to a select group of subaccounts.

The IA may engage in a short-term trading strategy in which the IA uses block trades to open and close a position prior to allotting any shares to its subaccounts. The IA then simultaneously allocates both the buy and sell trades—in effect, giving out pure profit or loss to the subaccounts involved.

This scenario identifies cases in which an IA shows a pattern of favorable or unfavorable treatment of a particular subaccount.

Scenario Implementation Approach

The detection process is separated in to two tracks that cover day trade allocations and non-day trade allocations.

Day Trade Allocations

For the purposes of this scenario, day trade allocations are instances in which an IA opens and closes a position through block trades, and then simultaneously allocates both trades to one or more of its subaccounts. Under these circumstances, the profit or loss from the trades is determined by the time they are distributed to the subaccounts. The detection logic recognizes a day trade allocation situation as being any case where a buy and a sell trade in the same security are allocated to a subaccount within 60 minutes of each other.

The detection process determines whether each day trade allocation resulted in a net gain or a net loss (termed "winning" and "losing" trades) for the subaccount involved. Over a period of a month, the detection process aggregates the count of winning and losing day trade allocations for each subaccount, as well as the amount gained or lost in these trades. The detection process also totals this information at the IA-level.

The detection process identifies situations in which the following criteria are met for a particular subaccount over the period of one month:

The subaccount receives at least A winning or losing day trade allocations.

At least B % of the subaccount's day trade allocations have the same outcome (i.e., at least B % are winners or losers).

If the subaccount receives a disproportionate number of winning trades, the total net gain from these trades must be at least $C. If the subaccount receives a disproportionate number of losing trades, the total net loss must be at least $C.

The subaccount receives at least D times its expected share of the IA's total gains or total losses from day trade allocations. The expected allocation to a subaccount is based on the assets in the subaccount relative to the assets under management by the IA.

Non-Day Trade Allocations

Non-day trade allocations are of interest if the price of the security involved changes appreciably between the time of the initial block trade and the time it is allocated. To identify these cases, the allocation price of each security is compared to the closing price on the day it was allocated. If the closing price differs from the trading price by more than 5%, the trade is potentially of interest. If the closing price is higher than the trading price, buy trades are considered "winners" and sell trades are considered "losers." The opposite is true in the case of price declines.

The detection process examines each non-day trade allocation to determine whether the allocation price was significantly different from the closing price of the security involved. Over a period of a month, the detection process aggregates the count of winning and losing allocations for each subaccount, as well as the amount gained or lost in these trades. The detection process also totals this information at the IA level.

The detection process identifies situations in which the following criteria are met for a particular subaccount over the period of one month:

The subaccount receives at least E winning or losing non-day trade allocations.

At least F % of the subaccount's non-day trade allocations have the same outcome (i.e., at least F % are winners or losers).

If the subaccount receives a disproportionate number of winning trades, the total net gain from these trades must be at least $G. If the subaccount receives a disproportionate number of losing trades, the total net loss must be at least $G.

The subaccount receives at least H times its expected share of the IA's total gains or total losses from non-day trade allocations. The expected allocation to a subaccount is based on the assets in the subaccount relative to the assets under management by the IA.

Parameters

FIG. 52 shows the parameters for the IA Block Trade Allocations scenario.

Focal Types
Investment Advisor
Highlights
Cust AC #=123, # Fav Trds=##, # Unfav Trds=##, Net=$$
Application Frequency
Monthly BIP 0720—IAs with Many Subaccounts that have Concentrated Positions Abbreviated Name
IA Subaccts w/Conc Posn Scenario Objective Investment portfolios that are over weighted in a single stock are more volatile than those that are diversified among a set of securities. Consequently, customers with a concentrated position in a single security are susceptible to experiencing a substantial loss over a short period of time. This scenario identifies investment advisors that have many subaccounts with concentrated positions. This situation may be an indication that the investment advisor is not following a prudent financial strategy, or may not be managing subaccounts in accordance with customer needs and expectations.

Scenario Implementation Approach

For the purposes of this scenario, a subaccount with a concentrated position is defined as one that meets the following condition:

Concentration Level in Single Equity Security>=X %

Small subaccounts—those with a total cash and security value less than $25K—are excluded from the detection logic for two reasons:

The potential risk for these accounts is less severe, due to the lower stakes involved.

Diversification is inherently more difficult to achieve in small accounts.

The detection process examines the subaccounts for each IA, and identifies cases where:

Concentrated Subaccounts/Total Subaccounts>=Y%

In some circumstances, a single household may have several accounts that are managed by a particular IA, and are each concentrated in the same security. This situation does not, by itself, imply a trend at the IA-level—rather, it suggests that the members of a certain household have an affinity for a particular security. To avoid generating misleading alerts from situations like this, the detection logic checks a final constraint requiring that:

Number of Distinct Household-Concentrated Security Combinations >=Z

This constraint also allows the detection process to avoid generating alerts on IAs that do not manage enough subaccounts to be of interest.

The scenario has two detection tracks:

Static—Finds all cases where an IA meets the criteria specified above, based on the most recent data available.

Recent Change—Finds cases where an IA meets the criteria using the most recent data available, but did not meet the criteria at the end of the previous month.

Parameters

FIG. 56 shows the parameters for the IAs with Many Subaccounts That Have Concentrated Positions scenario.

Focal Types
Investment Advisor
Highlights
Tot subaccts >$25K=##, Conc Subaccts=##, High Conc Sec=##
Application Frequency
Monthly

What is claimed is:

1. A computer program embodied on a computer executable medium for identifying a situation representing risk to a brokerage or its investors, wherein the program comprises one or more sequences of instructions that cause one or more processors to perform the steps of:

receiving data representative of:

a plurality of transactions relating to securities trading, and a plurality of entities involved in securities trading, wherein the plurality of transactions and the plurality of entities are not predetermined to be related:

identifying a behavior of interest comprising outlier detection analysis to identify at least one of the transactions and entities outside of a defined statistical range that are indicative of a risk to a brokerage or its investors by identifying rapid switching of a first mutual fund or a second mutual fund, wherein one or more of the plurality of transactions is a solicited transaction involving one or more customers of a securities brokerage and one or more securities representatives, wherein the solicited transaction is solicited by the securities representative, wherein proceeds associated with the switching are at least a percentage of a value of the first mutual fund;

determining whether one or more groups of the transactions and entities collectively satisfy at least one of the one or more of the sequence detection requirements;

in response to one or more groups of the transactions and entities collectively satisfying at least one of the one or more sequence detection requirements, generating an alert informing a user of the one or more groups of the transactions and entities.

2. The computer program of claim 1, wherein the instructions further cause the one or more processors to perform one or more of the following on the plurality of transactions and the plurality of entities:

sequence matching to identify sequences in one or more transactions and to relate the identified sequences to one or more of the entities in the received data;

link analysis to establish connections between one or more transactions and entities in the received data;

rule-based analysis to identify at least one of the transactions and entities based on rules specifying parameters and thresholds;

decision tree analysis; and detection processing using neural networks.

* * * * *